US006941767B2

(12) United States Patent
Matsuoka et al.

(10) Patent No.: US 6,941,767 B2
(45) Date of Patent: Sep. 13, 2005

(54) COMPRESSION MECHANISM OIL EQUALIZING CIRCUIT, REFRIGERATION SYSTEM HEAT SOURCE UNIT, AND REFRIGERATION SYSTEM PROVIDED WITH THE SAME

(75) Inventors: Hiromune Matsuoka, Sakai (JP); Shinya Matsuoka, Sakai (JP); Yasushi Hori, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/489,299

(22) PCT Filed: May 12, 2003

(86) PCT No.: PCT/JP03/05913

§ 371 (c)(1),
(2), (4) Date: Mar. 11, 2004

(87) PCT Pub. No.: WO03/104723

PCT Pub. Date: Dec. 18, 2003

(65) Prior Publication Data

US 2004/0231357 A1 Nov. 25, 2004

(30) Foreign Application Priority Data

Jun. 11, 2002 (JP) .................................... 2002-170454
Jan. 10, 2003 (JP) .................................... 2003-003881

(51) Int. Cl.$^7$ ............................................. F25B 43/02
(52) U.S. Cl. ......................................... 62/470; 62/510
(58) Field of Search ........................ 62/470, 192, 193, 62/228.5, 324.1, 324.4, 324.6, 510, 468, 469; 417/228; 418/DIG. 1, 84

(56) References Cited

U.S. PATENT DOCUMENTS 3,580,006 A * 5/1971 Quick ...................... 62/196.2
4,210,001 A * 7/1980 Miller, Sr. ................... 62/468
4,589,263 A * 5/1986 DiCarlo et al. .............. 62/193
4,926,652 A * 5/1990 Kitamoto ..................... 62/175

(Continued)

FOREIGN PATENT DOCUMENTS

| JP | 62-87771 | | 4/1987 |
|---|---|---|---|
| JP | 4-320763 | | 11/1992 |
| JP | 5-141808 | | 6/1993 |
| JP | 6-109337 | | 4/1994 |
| JP | 8-200225 A | * | 8/1996 |
| JP | 10-205896 A | * | 8/1998 |
| JP | 2001-174081 A | * | 6/2001 |
| JP | 2001-324235 A | * | 11/2001 |
| JP | 2001-349625 A | * | 12/2001 |
| JP | 2001-349644 | * | 12/2001 |
| JP | 2002-147876 | * | 5/2002 |

Primary Examiner—Mohammad M. Ali
(74) Attorney, Agent, or Firm—Shinjyu Global IP Counselors, LLP

(57) ABSTRACT

The present invention provides an oil equalizing circuit that can improve the reliability of the oil supply to the compression mechanisms in a refrigeration system provided with a plurality of compression mechanisms. The compressor group of the air conditioning system is equipped chiefly with first, second, and third compressors and an oil equalizing circuit. The oil equalizing circuit is equipped with the first, second and third oil separators provided on the discharge sides of the compressors; first, second, and third oil return pipes connecting the oil separators to the intake sides of the compressors; a communication pipe for allowing the oil return pipes to communicate with one another; first, second, and third oil ON-OFF switching mechanisms provided downstream of the parts where the oil return pipes connect to the communication pipe; and first, second, and third pressure reducing mechanisms provided upstream of the parts where the oil return pipes connect to the communication pipe.

20 Claims, 7 Drawing Sheets

U.S. PATENT DOCUMENTS

| | | | | |
|---|---|---|---|---|
| 5,094,598 A | * | 3/1992 | Amata et al. | 417/533 |
| 5,321,956 A | * | 6/1994 | Kemp et al. | 62/193 |
| 5,361,595 A | * | 11/1994 | Shimura et al. | 62/175 |
| 5,522,233 A | * | 6/1996 | Nares et al. | 62/193 |
| 5,634,345 A | * | 6/1997 | Alsenz | 62/84 |
| 5,673,570 A | * | 10/1997 | Sada | 62/468 |
| 5,685,163 A | * | 11/1997 | Fujita et al. | 62/211 |
| 5,732,564 A | * | 3/1998 | Misawa et al. | 62/218 |
| 5,765,380 A | * | 6/1998 | Misawa et al. | 62/210 |
| 5,768,903 A | * | 6/1998 | Sekigami et al. | 62/196.2 |
| 5,775,117 A | * | 7/1998 | Shaw | 62/196.3 |
| 5,799,867 A | * | 9/1998 | Misawa | 237/2 B |
| 5,894,735 A | * | 4/1999 | Misawa et al. | 62/177 |
| 5,996,363 A | * | 12/1999 | Kurachi et al. | 62/192 |
| 6,029,472 A | * | 2/2000 | Galbreath, Sr. | 62/475 |
| 6,202,424 B1 | * | 3/2001 | Hattori et al. | 62/93 |
| 6,263,691 B1 | * | 7/2001 | Ueno et al. | 62/292 |
| 6,453,691 B1 | * | 9/2002 | Seo et al. | 62/228.5 |
| 6,604,371 B2 | * | 8/2003 | Ueno | 62/193 |
| 6,722,156 B2 | * | 4/2004 | Tanimoto et al. | 62/510 |

* cited by examiner

COMPRESSION MECHANISM OIL EQUALIZING CIRCUIT, REFRIGERATION SYSTEM HEAT SOURCE UNIT, AND REFRIGERATION SYSTEM PROVIDED WITH THE SAME

TECHNICAL FIELD

The present invention relates to an equalizing circuit for a compression mechanism, a heat source unit for a refrigeration system, and a refrigeration system equipped with the same. More specifically, the present invention relates to a vapor compression refrigeration system provided with a plurality of compression mechanisms for compressing the refrigerant, the refrigeration system being further provided with an equalizing circuit for equalizing the distribution of oil among the compression mechanisms and a refrigeration system heat source unit.

BACKGROUND ART

One example of conventional vapor compression refrigeration systems provided with a plurality of compression mechanisms are air conditioning systems used to air-condition buildings. This kind of air conditioning system is provided with a plurality of user units and a heat source unit capable of accommodating the heating and cooling loads of the user units. In order to enable the system to be operated in a partial load mode, the heat source unit is provided with a circuit configuration made up of a plurality of comparatively small-capacity compression mechanisms connected in parallel. The compression mechanisms are provided with an oil equalizing circuit including oil separators connected to the discharge sides of the compression mechanisms, oil return pipes for returning the oil separated by the oil separators to the compression mechanisms, and oil equalizing pipes connected between the compression mechanisms for reducing imbalances in the amount of oil in the compression mechanisms.

In the conventional oil equalizing circuit just described, the amount of oil in each compression mechanism is ensured by providing oil return pipes and oil equalizing pipes. However, there are times when air conditioning systems provided with a plurality of compression mechanisms are run in a partial load mode in which some compression mechanisms are running and some are stopped and times when such systems are run in a partial load mode in which some compression mechanisms are operated with a reduced operating load using inverter control or the like. During these various operating patterns, it is sometimes difficult to supply oil sufficiently to the compression mechanisms that are running. Thus, the reliability of the oil supply achieved with conventional oil equalizing circuits is insufficient.

DISCLOSURE OF THE INVENTION

The object of this invention is to provide an oil equalizing circuit that can improve the reliability of the oil supply to the compression mechanisms.

In a first embodiment of the present invention, a compression mechanism oil equalizing circuit is provided for equalizing the distribution of oil among the compression mechanisms in a vapor compression refrigeration system provided with a plurality of compression mechanisms for compressing the refrigerant. The oil equalizing circuit is provided with oil separators, oil return pipes, a communication pipe, oil ON-OFF switching means, and pressure reducing means. The oil separators are provided on the discharge side of the compression mechanisms and function to separate the oil from the gaseous refrigerant. The oil return pipes connect each oil separator to the intake side of its respective compression mechanism and allow the oil separated by the oil separators to be delivered to the intake sides of the compression mechanisms. The communication pipe is connected to the oil return pipes so that the oil return pipes can communicate with each other. Oil ON-OFF switching means are provided in each oil return pipe. The oil ON-OFF switching means serve both to ensure the flow of oil to the communication pipe from the oil separators and to turn on and shut off—by being opened and closed—the delivery of oil from each oil separator to the intake side of the respective compression mechanism. The pressure reducing means are provided in each oil return pipe or the communication pipe and serve to reduce the pressure of the oil sent from the oil separators to the communication pipe and the intake sides of the compressor mechanisms.

This compression mechanism oil equalizing circuit can supply the oil separated by the oil separators to the intake sides of the compression mechanisms by opening the oil ON-OFF switching means provided in the oil return pipes. Meanwhile, the supply of oil can be shut off by closing the oil ON-OFF switching means. As a result, the supply of oil to compression mechanisms that are stopped can be cut off and a sufficient amount of oil can be supplied to the compression mechanisms that are running, thereby improving the reliability of the oil supply to the compression mechanisms.

In a second embodiment of the present invention, a compression mechanism oil equalizing circuit is provided in accordance with the first aspect, wherein the oil separators are provided so as to correspond to each of the compression mechanisms.

In a third aspect of the present invention, a compression mechanism oil equalizing circuit is provided in accordance with the first aspect or the second aspect, wherein the oil separators each include a first stage oil separator that is connected to the dischar side of the compression mechanism and configured to separate oil from the gaseous rigerant and a second stage oil separator that is connected to the first stage oil separator and configured to collect the oil separated by the first stage oil separator. The oil return pipes are connected to the second stage oil separators.

With this compression mechanism oil equalizing circuit, the oil separated from the gaseous refrigerant in the first stage oil separator can be immediately sent to the second stage oil separator, thereby reducing the amount of oil mixing with the gaseous refrigerant flowing out of the first stage oil separator.

In a fourth aspect of the present invention, a compression mechanism oil equalizing circuit is provided in accordance with the third aspect and further provided with gas return pipes connecting the gas phase sections of the second stage oil separators to the intake sides of the compression mechanisms.

With this compression mechanism oil equalizing circuit, the gaseous refrigerant and other gaseous components mixed with the oil sent from the first stage oil separator and collected in the second stage oil separator can be returned to the intake side of the compression mechanism, thereby increasing the separating capacity of the oil separator as a whole.

In a fifth aspect of the present invention, a compression mechanism oil equalizing circuit is provided in accordance with the first to fourth aspects, wherein the oil ON-OFF switching means are provided downstream of the arts where the oil return pipes connect to the communication pipe.

With this compression mechanism oil equalizing circuit, the oil ON-OFF switching means are provide downstream of the parts where the oil return pipes connect to the communication pipe. As a result, both the function of turning on and shutting off the delivery of oil to the intake side of the compression mechanism and the function of ensuring the flow of oil to the communication pipe from the oil separator can be accomplished with a single oil ON-OFF switching means, thereby reducing the number of parts making up the oil equalizing circuit.

In a sixth aspect of the present invention, a compression mechanism oil equalizing circuit is provided in accordance with any one of the first to fifth aspects, wherein the pressure reducing means are provided upstream of the parts where the oil return pipes connect to the communication pipe.

With this compression mechanism oil equalizing circuit, the pressure reducing means are provided upstream of the parts where the oil return pipes connect to the communication pipe. As a result, both the function of reducing the pressure of the oil flowing to the intake side of the compression mechanism and the function of reducing the pressure of the oil flowing toward the communication pipe can be accomplished with a single pressure reducing means, thereby reducing the number of parts making up the oil equalizing circuit.

In a seventh aspect of the present invention, a compression mechanism oil equalizing circuit is provided in accordance with any one of the first to sixth aspects, wherein the pressure reducing means are capillary tubes.

With this compression mechanism oil equalizing circuit, the structure is simplified because capillary tubes are used as the pressure reducing means.

In the eighth aspect of the present invention, a refrigeration system is provided with a plurality of compression mechanisms for compressing the refrigerant, an oil equalizing circuit in accordance with any one of the first to seventh aspects for equalizing the distribution of oil among the compression mechanisms, and an oil equalization control means. The oil equalization control means detects if the compression mechanisms are running or stopped, executes control to close the oil ON-OFF switching means corresponding to the stopped compression mechanisms so that oil does not flow to the intake sides of the stopped compression mechanisms, and executes control to open the oil ON-OFF switching means corresponding to running compression mechanisms so that oil is supplied to the intake side of the running compression mechanisms.

Since this refrigeration system is provided with an oil equalization control means for controlling the oil equalizing circuit, oil can be supplied exclusively to the compression mechanisms that are running by opening and closing the oil ON-OFF switching means of the compression mechanisms in accordance with whether or not each compression mechanism is running. Thus, the reliability of the oil supply to the compression mechanisms can be improved.

In the ninth aspect of the present invention, a refrigeration system is provided with a plurality of compression mechanisms for compressing the refrigerant, an oil equalizing circuit in accordance with any one of the first to seventh aspects for equalizing the distribution of oil among the compression mechanisms, and an oil equalization control means. The oil equalization control means detects if the compression mechanisms are running or stopped, executes control to close the oil ON-OFF switching means corresponding to the stopped compression mechanisms so that oil does not flow to the intake sides of the stopped compression mechanisms, and, when one compression mechanism is running, executes control to open the oil ON-OFF switching means corresponding to the running compression mechanism so that oil is supplied to the intake side of the running compression mechanism. When there are two or more compression mechanisms that are running, oil is supplied to the intake side of all of the compression mechanisms that are running by opening the oil ON-OFF switching means corresponding to the running compression mechanism one at a time for a prescribed period of time each in a periodic manner, keeping the other oil ON-OFF switching means closed while one is open.

With this refrigeration mechanism, the oil equalization control means for controlling the oil equalizing circuit can achieve the following oil equalization operating modes. When one compression mechanism is running, the oil equalization control means supplies oil by opening only the oil ON-OFF switching means corresponding to the compression mechanism that is running. When two or more compression mechanisms are running, the oil equalization control means supplies oil to the compression mechanisms that are running by supplying oil to one running compression mechanism at a time for a prescribed period of time each in a periodic manner. When two or more compression mechanisms are running, oil is supplied intermittently to only one compression mechanism at a time through the oil return pipes and, as a result, oil is supplied to all of the running compression mechanisms with certainty. Thus, the reliability of the oil supply to the compression mechanisms can be improved.

In a tenth aspect of the present invention, a refrigeration system is provided in accordance with the ninth aspect, wherein the oil equalization control means controls the oil ON-OFF switching means corresponding to the compression mechanisms that are running in such a manner that when one oil ON-OFF switching means is switched from the closed state to the open state, there is a transitional period which both oil ON-OFF switching means are in the open state simultaneously.

With this refrigeration system, the oil equalization control means for controlling the oil equalizing circuit controls the oil ON-OFF switching means in such a manner that when one oil ON-OFF switching means is switched from the open state to the closed state and another oil ON-OFF switching means is switched from the closed state to the open state, there is a transitional period during which both oil ON-OFF switching means are in the open state simultaneously. Consequently, such undesirable situations as all of the oil ON-OFF switching means being closed such that the discharge of oil from the oil separators is obstructed can be prevented. As a result, the flow of oil through the oil equalizing circuit can be switched in a reliable manner.

In an eleventh aspect of the present invention, a refrigeration system heat source unit is a heat source unit for a refrigeration system provided with a compression mechanism for compressing the refrigerant, the heat source unit being provided with an oil separator, an oil return pipe, and a connection pipe. The oil separator is provided on the discharge side of the compression mechanism and serves to separate oil from the gaseous refrigerant. The oil return pipe is provided with an oil ON-OFF switching means that can turn on and shut off the supply of oil from the oil separator to the intake side of the compression mechanism. The connection pipe is connected to the oil return pipe between the oil separator and the oil ON-OFF switching means and makes it possible to connect to the oil return pipes of the compressor mechanisms of other heat source units.

With this refrigeration system heat source unit, when a plurality of heat source units are connected together in parallel and the oil ON-OFF switching means of the oil return pipes of the heat source units are opened, oil separated by the oil separators can be supplied to the intake side of the compression mechanisms of the heat source units. Meanwhile, the supply of oil to the intake sides of the compression mechanisms of the heat source units can be shut off by closing the oil ON-OFF switching means provided in the oil return pipes of the heat source units. As a result, the supply of oil to compression mechanisms that are stopped can be cut off and oil can be supplied exclusively to the compression mechanisms that are running, thereby improving the reliability of the oil supply to the compression mechanisms.

In a twelfth aspect of the present invention, a refrigeration unit heat source unit is provided in accordance with the eleventh aspect, wherein the oil separator includes a first stage oil separator that is connected to the discharge side of the compression mechanism and configured to separate oil from the gaseous refrigerant and a second stage oil separator that is connected to the first stage oil separator and configured to collect the oil separated by the first stage oil separator. The oil return pipe is connected to the second stage oil separator.

With this refrigeration system heat source unit, the oil separated from the gaseous refrigerant in the first stage oil separator can be immediately sent to the second stage oil separator, thereby reducing the amount of oil mixing with the gaseous refrigerant flowing out of the first stage oil separator.

In a thirteenth aspect of the present invention, a refrigeration system heat source is provided in accordance with the twelfth aspect, and further provided with a gas return pipe connecting the gas phase section of the second stage oil separator to the intake side of the compression mechanism.

With this refrigeration system heat source unit, the gaseous refrigerant and other gaseous components mixed with the oil sent from the first stage oil separator and collected in the second stage oil separator can be returned to the intake side of the compression mechanism, thereby increasing the separating capacity of the oil separator as a whole.

In a fourteenth aspect of the present invention, a refrigeration system is provided with a plurality of refrigeration system heat source units in accordance with any one of the eleventh to thirteenth aspects and a communication pipe connecting the connection pipes of the heat source units together.

With this refrigeration system, oil can be equalized among the heat source units because the oil return pipes of the oil separators of the heat source units are connected together.

BRIEF DESCRIPTIONS OF THE DRAWINGS

PREFERRED EMBODIMENTS OF THE INVENTION

Embodiments of compression mechanism oil equalizing circuits and refrigeration systems equipped therewith will now be described with reference to the drawings.

[First Embodiment]

Figure 1:
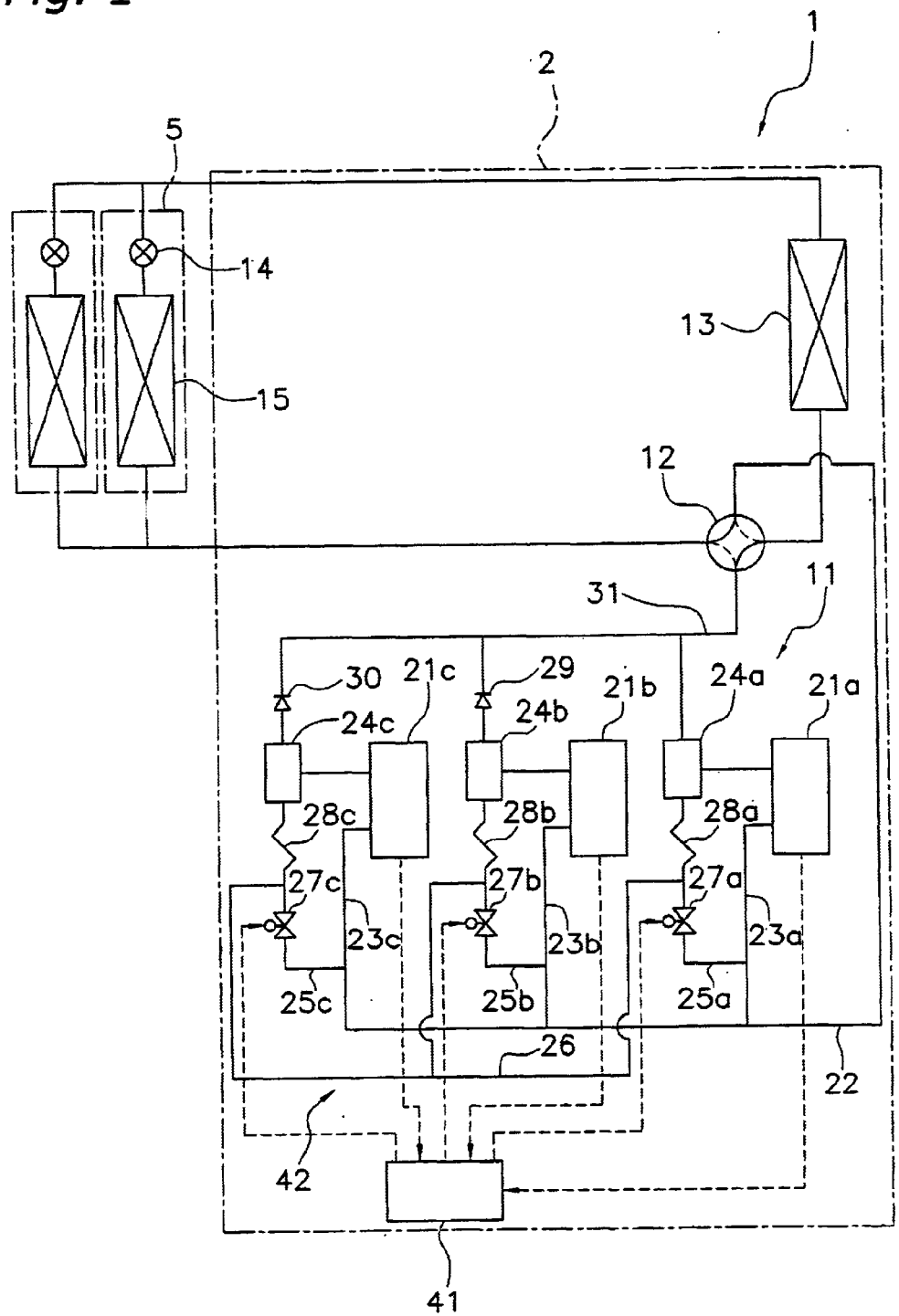
FIG. 1 is a schematic view of the refrigerant circuit of an air conditioning system provided with an oil equalizing circuit in accordance with a first embodiment of the present invention.

(1) Constituent Features of the Refrigerant Circuit and Oil Equalizing Circuit of an Air Conditioning System FIG. 1 is a schematic view of the refrigerant circuit of an air conditioning system 1 serving as a first embodiment of a compression mechanism oil equalizing circuit in accordance with the present invention and a refrigeration system provided with the same.

The air conditioning system 1 is provided with one heat source unit 2 and a plurality of user units 5 (two in this embodiment) connected in parallel thereto. It is used, for example, to air-condition an office building or the like. The heat source unit 2 is equipped chiefly with first, second, and third compressors 21a to 21c, a four-way selector valve 12, and heat-source-side heat exchanger 13. In this embodiment, the heat-source-side heat exchanger 13 serves to exchange heat between the refrigerant and air or water serving as a heat source. The user units 5 are each equipped chiefly with an expansion valve 14 and a user side heat exchanger 15. These devices 12 to 15 and 21a to 21c are connected together in sequence by refrigerant piping to form the refrigerant circuit of the air conditioning system 1.

The first, second, and third compressors 21a to 21c are compression mechanisms for compressing the gaseous refrigerant that returns to the heat source unit 2 after passing through the user-side heat exchanger 15 of the user unit 5 and are connected in parallel to form a compressor group 11. In this embodiment, the first compressor 21a has a built-in inverter so that its operating capacity can be varied by controlling the rotational speed and the second and third compressors 21b, 21c are fixed-capacity compressors not provided with inverters.

The compressor group 11 is equipped with the following: first, second, and third compressors 21a to 21c; refrigerant intake main pipe 22, first, second, and third intake branch pipes 23a to 23c; an oil equalizing circuit 42; and a discharge merge pipe 31.

The refrigerant intake main pipe 22 connects to the outlet of the four-way selector valve 12. The discharge merge pipe 31 connects to the inlet of the four-way selector valve 12. The first, second, and third intake branch pipes 23a to 23c branch in a parallel manner from the refrigerant intake main pipe 22 and connect to the intake sides of the first, second, and third compressors 21a to 21c, respectively. The discharge sides of the first, second, and third compressors 21a to 21c are connected to the discharge merge pipe 31 through first, second, and third oil separators 24a to 24c (discussed later). The check valves 29 and 30 are provided downstream of the second and third oil separators 24b, 24c, respectively.

The oil equalizing circuit 42 serves to equalize the oil distribution among the first, second, and third compressors 21a to 21c and is provided with the following: first, second, and third oil separators 24a to 24c; first, second, and third oil return pipes 25a to 25c; a communication pipe 26; first, second, and third oil ON-OFF switching means 27a to 27c; and first, second, and third pressure reducing means 28a to 28c. The first, second, and third oil separators 24a to 24c are connected to the discharge sides of the first, second, and third compressors 21a to 21c and serve to separate oil from the gaseous refrigerant. The first, second, and third oil return pipes 25a to 25c connect first, second, and third oil separators 24a to 24c to the intake sides of the compressors 21a to 21c (more specifically, to the first, second, and third intake branch pipes 23a to 23c), respectively, and serve to deliver the oil separated by the first, second, and third oil separators 24a to 24c to the intake sides of the compressors 21a to 21c. The communication pipe 26 is connected to the oil return pipes 25a to 25c so that the oil return pipes 25a to 25c can communicate with each other. The first, second, and third oil ON-OFF switching means 27a to 27c are provided in the oil return pipes 25a to 25c, respectively, and serve both to ensure the flow of oil to the communication pipe 26 from the oil separators 24a to 24c and to turn on and shut off the delivery of oil from the first, second, and third oil separators 24a to 24c to the intake sides of the compressors 21a to 21c. More specifically, the first, second, and third oil ON-OFF switching means 27a to 27c are solenoid valves provided downstream of the parts where the oil return pipes 25a to 25c connect to the communication pipe 26. The first, second, and third pressure reducing means 28a to 28c are provided in the oil return pipes 25a to 25c or in the communication pipe 26 and serve to reduce the pressure of the oil that flows from the first, second, and third oil separators 24a to 24c to the intake sides of the compressors 21a to 21c and the communication pipe 26. More specifically, the first, second, and third pressure reducing means 28a to 28c are capillary tubes provided upstream of the parts where the oil return pipes 25a to 25c connect to the communication pipe 26.

The air conditioning system 1 is further provided with an oil equalization control means 41 that detects if the first, second, and third compressors 21a to 21c are running or stopped and opens and closes the first, second, and third oil ON-OFF switching means 27a to 27c accordingly. More specifically, the oil equalization control means 41 detects if the compressors 21a to 21c are running or stopped, executes control to close the oil ON-OFF switching means corresponding to the stopped compressors so that oil does not flow to the intake sides of the stopped compressors, and executes control to open the oil ON-OFF switching means corresponding to running compressors so that oil is supplied to the intake sides of the running compressors. In this embodiment, the oil equalization control means 41 is installed inside the heat source unit 2.

(2) Operation of the Air Conditioning System and the Oil Equalizing Circuit

Figure 2:
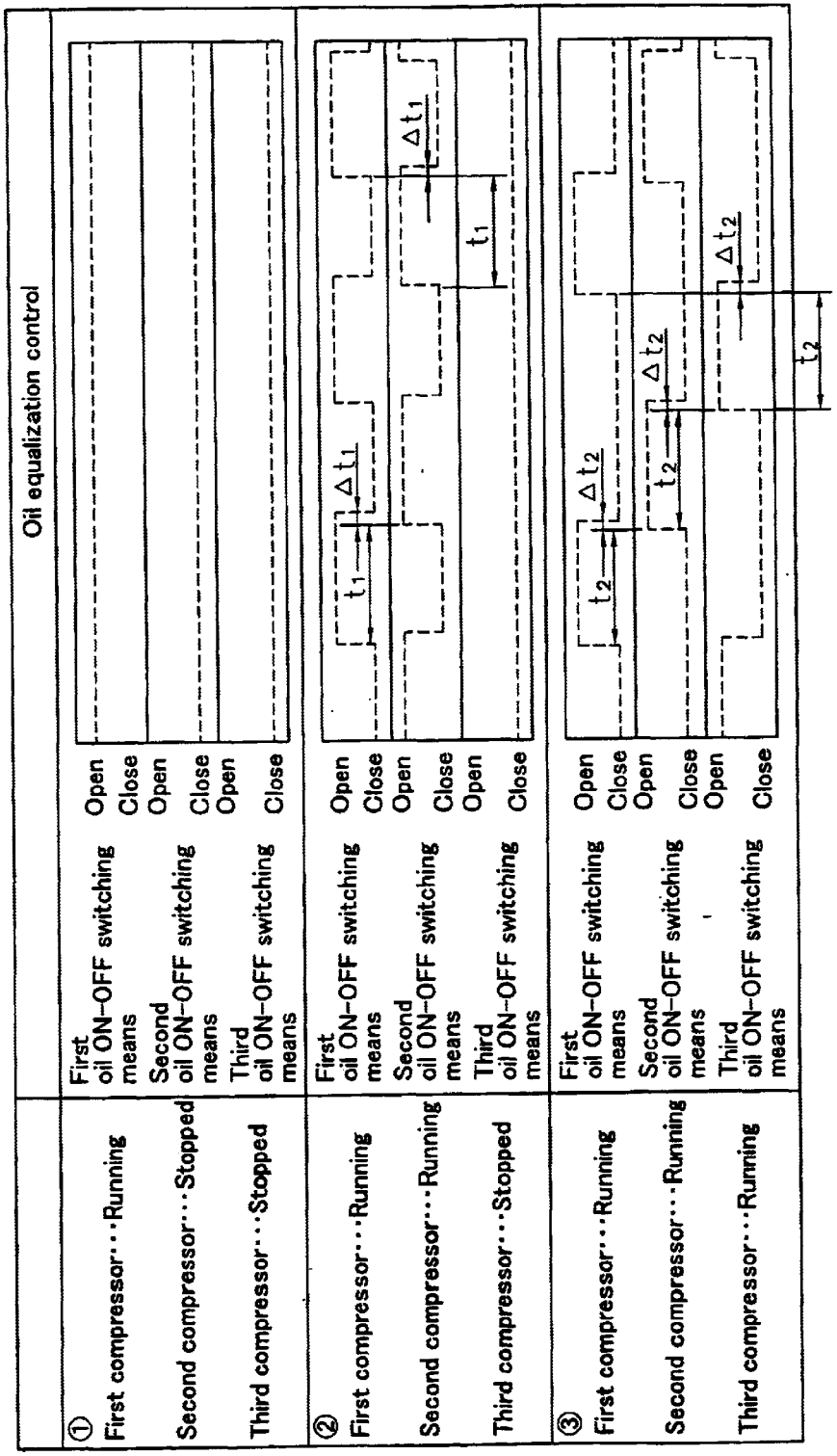
FIG. 2 is illustrates the control states of the oil ON-OFF switching means in the oil equalizing circuit of the first embodiment.

The operation of the air conditioning system 1 and oil equalizing circuit 42 of this embodiment will now be described using FIGS. 1 to 2. FIG. 2 illustrates the control states of the oil ON-OFF switching means 27a to 27c in the oil equalizing circuit 42 according to the operating pattern of the compressors 21a to 21c.

[1] Partial Load Operation (First Compressor Running)

When the air conditioning system 1 is run, first the inverter-controllable first compressor 21a is started. As a result, oil together with gaseous refrigerant flows from the refrigerant intake main pipe 22 into the first compressor 21a through the first intake branch pipe 23a. The gaseous refrigerant drawn into the first compressor 21a is then compressed and discharged, after which it flows into the first oil separator 24a. Since the gaseous refrigerant discharged from the first compressor 21a contains excess oil, the excess oil is separated from the gaseous refrigerant by vapor-liquid separation in the first oil separator 24a. Then, the gaseous refrigerant passes through the refrigerant pipe at the outlet of the first oil separator 24a, flows into the discharge merge pipe 31, and circulates through the refrigerant circuit of the air conditioning system 1.

Meanwhile, the oil equalization control means 41 detects that the first compressor 21a is running and the second and third compressors 21b, 21c are stopped and issues an open command to the first oil ON-OFF switching means 27a and a close command to the second and third oil ON-OFF switching means 27b and 27c corresponding to the second and third compressors 21b, 21c, which are stopped. (See ① of FIG. 2.) As a result of this control, oil separated by the first oil separator 24a is returned to the first intake branch pipe 23a through the first oil return pipe 25a and is drawn again into the first compressor 21a along with gaseous refrigerant. Since the second and third compressors 21b, 21c are stopped, the oil pressure at the parts where the second and third oil return pipes 25b, 25c connect to the communication pipe 26 is held higher than the oil pressure at the part where the first oil return pipe 25a connects to the communication pipe 26 and oil that has collected in the second and third oil separators 24b, 24c and the second and third oil return pipes 25b, 25c flows into the first oil return pipe 25a through the communication pipe 26. In this way, when only the first compressor 21a is run, oil inside the refrigerant circuit is supplied only to the first compressor 21a.

[2] Partial Load Operation (First and Second Compressors Running)

If, after the first compressor 21a is started, the second compressor 21b is started in order to increase the operating load, gaseous refrigerant flowing through the refrigerant intake main pipe 22 will be drawn into both the first compressor 21a and the second compressor 21b. Similarly to the gaseous refrigerant drawn into the first compressor 21a, the gaseous refrigerant drawn into the second compressor 21b is then compressed and discharged, after which it flows into the second oil separator 24b where the gaseous refrigerant and oil are separated by vapor-liquid separation. Then, the gaseous refrigerant passes through the refrigerant pipe at the outlet of the second oil separator 24b, flows into the discharge merge pipe 31, merges with the gaseous refrigerant discharged from the first compressor 21a, and circulates through the refrigerant circuit of the air conditioning system 1.

Meanwhile, the oil equalization control means 41 detects that the first and second compressors 21a, 21b are running and the third compressor 21c is stopped and issues an open command to the first and second oil ON-OFF switching means 27a, 27b and a close command to the third oil ON-OFF switching means 27c. Then, the oil equalization control means 41 controls the first and second oil ON-OFF switching means 27a, 27b corresponding to the first and second compressors 21a, 21b (which are running) such that they are repeatedly opened and closed alternately (periodically) for a prescribed time t1 each, i.e., first the first oil ON-OFF switching means 27a is opened for a prescribed time t1 while the second oil ON-OFF switching means 27b is closed and next the second oil ON-OFF switching means 27b is opened for a prescribed time t1 while the first oil ON-OFF switching means 27a is closed, and so on. Thus, oil is supplied to the intake sides of the two compressors that are running, i.e., the first and second compressors 21a, 21b (see (2) of FIG. 2). As a result, oil is delivered to the first and second compressors 21a, 21b with certainty, although intermittently. The prescribed time t1 is set to an amount of time that takes into account such factors as the time that oil resides inside the running compressors 21a, 21b so that oil deficiencies do not occur at the compressors 21a, 21b during the periods when oil is not supplied to them. Furthermore, the oil equalization control means 41 opens and closes the first and second oil ON-OFF switching means 27a, 27b in such a manner that when one oil ON-OFF switching means (27a, for example) is switched from the open state to the closed state and the other oil ON-OFF switching means (27b, for example) is switched from the closed state to the open state, there is a transitional period Δt1 during which both oil ON-OFF switching means 27a, 27b are in the open state simultaneously (see (2) of FIG. 2). More specifically, when the oil equalization control means 41 switches from a state in which one of the first and second oil ON-OFF switching means (27a or 27b) is open and the other of the first and second oil ON-OFF switching means (27b or 27a) is closed to the opposite state in which the open and closed oil ON-OFF switching means are reversed, it first opens the first or second oil ON-OFF switching means (27b or 27a) that was closed while keeping the first or second oil ON-OFF switching means (27a or 27b) that was open in the open state. It then closes the first or second oil ON-OFF switching means (27a or 27b) that was open after the period Δt1 has elapsed (see (2) of FIG. 2).

[3] Full Load Operation (First, Second, and Third Compressors Running)

If, after the second compressor 21b is started, the third compressor 21c is started in order to achieve full-load operation, gaseous refrigerant flowing through the refrigerant intake main pipe 22 will be drawn into the first, second, and third compressors 21a to 21c. Similarly to the gaseous refrigerant drawn into the first and second compressors 21a, 21b, the gaseous refrigerant drawn into the third compressor 21c is compressed and discharged, after which it flows into the third oil separator 24c where the gaseous refrigerant and excess oil are separated by vapor-liquid separation. Then, the gaseous refrigerant passes through the refrigerant pipe at the outlet of the third oil separator 24c, flows into the discharge merge pipe 31, merges with the gaseous refrigerant discharged from the first and second compressors 21a, 21b, and circulates through the refrigerant circuit of the air conditioning system 1.

Meanwhile, the oil equalization control means 41 detects that the first, second, and third compressors 21a to 21c are running and issues open commands to the first, second, and third oil ON-OFF switching means 27a to 27c. Then, similarly to when two compressors, i.e., the first and second compressors 21a and 21b, are run, the oil equalization control means 41 controls the first, second and third oil ON-OFF switching means 27a to 27c such that they are repeatedly opened and closed alternately (periodically) for a prescribed time t2 each, i.e., first the first oil ON-OFF switching means 27a is opened for a prescribed time t2 while the second and third oil ON-OFF switching means 27b, 27c are closed, next the second oil ON-OFF switching means 27b is opened for a prescribed time t2 while the first and third oil ON-OFF switching means 27a, 27c are closed, then the third oil ON-OFF switching means 27c is opened for a prescribed time t2 while the first and second oil ON-OFF switching means 27a, 27b are closed, and so on. As a result, oil is supplied to the intake sides of the compressors that are running, i.e., the first, second, and third compressors 21a to 21c (see (3) of FIG. 2). As a result, oil is delivered to the first, second, and third compressors 21a to 21c with certainty, although intermittently. Similarly to the previously described time period t1, the prescribed time t2 is set to an amount of time that takes into account such factors as the time that oil resides inside the running compressors 21a to 21c so that oil deficiencies do not occur at the compressors 21a to 21c during the periods when oil is not supplied to them.

Furthermore, similarly to when two compressors, i.e., the first and second compressors 21a and 21b, are run, the oil equalization control means 41 opens and closes the first, second, and third oil ON-OFF switching means 27a to 27c in such a manner that when one oil ON-OFF switching means (27a, 27b, or 27c) is switched from the open state to the closed state and another oil ON-OFF switching means (27a, 27b, or 27c) is switched from the closed state to the open state, there is a transitional period Δt2 during which both oil ON-OFF switching means are in the open state simultaneously (see (3) of FIG. 2).

(3) Characteristic Features of the Air Conditioning System and the Oil Equalizing Circuit The oil equalizing circuit 42 of this embodiment has the following characteristic features.

[1] Improved Reliability of the Oil Supply to the Compressors

With the oil equalizing circuit 42 of this embodiment, oil separated by the first, second, and third oil separators 24a to 24c can be delivered to the intake sides of the compressors 21a to 21c by opening the first, second, and third oil ON-OFF switching means 27a to 27c provided in the first, second, and third oil return pipes 25a to 25c. The delivery of oil to the compressors 21a to 21c can also be shut off by closing the first, second, and third oil ON-OFF switching means 27a to 27c. Furthermore, since the oil return pipes 25a to 25c are connected together by the communication pipe 26, the oil in the oil return pipes whose oil ON-OFF switching means are closed flows through communication pipe 26 into the oil return pipes whose oil ON-OFF switching means are open. As a result, the supply of oil to compressors that are stopped can be cut off and a sufficient amount of oil can be supplied to the compressors that are running, thereby improving the reliability of the oil supply to the first, second, and third compressors 21a to 21c.

Also, since the oil return pipes 25a to 25c are connected to the communication pipe 26 at a position downstream of the pressure reducing means 28a to 28c, the oil pressure in oil return pipes whose oil ON-OFF switching means are closed is higher than the oil pressure in the oil return pipes whose oil ON-OFF switching means are open. As a result, oil that has collected in oil separators and oil return pipes whose oil ON-OFF switching means 27a to 27c are closed flows into the oil return pipes whose oil ON-OFF switching means are open through the communication pipe 26. As a result, oil is reliably delivered to the compressors that are running.

[2] Simply Constructed Oil Equalizing Circuit

In the oil equalizing circuit 42 of this embodiment, the first, second, and third oil ON-OFF switching means 27a to 27c are provided downstream of the parts where the oil return pipes 25a to 25c connect to the communication pipe 26. As a result, both the function of turning on and cutting off the delivery of oil to the intake side of the compressors 21a to 21c and the function of ensuring the flow of oil to the communication pipe 26 from the oil separators 24a to 24c can be accomplished, thereby reducing the number of parts making up the oil equalizing circuit 42.

Furthermore, with this oil equalizing circuit 42, the first, second, and third pressure reducing means 28a to 28c are provided upstream of the parts where the oil return pipes 25a to 25c connect to the communication pipe 26. As a result, both the function of reducing the pressure of the oil flowing to the intake side of the compressors 21a to 21c and the function of reducing the pressure of the oil flowing toward the communication pipe 26 can be accomplished, thereby reducing the number of parts making up the oil equalizing circuit 42. Also, the construction is simple because capillary tubes are used for the first, second, and third pressure reducing means 28a to 28c.

[3] Periodic Open/Close Control of the Oil ON-OFF Switching Means Corresponding to Compressors that are Running With the air conditioning system 1 of this embodiment, the oil equalization control means 41 can accomplish the following oil equalization operating modes. For example, when the first compressor 21a is running and the second and third compressors 21b, 21c are stopped (i.e., when the number of running compressors is one), oil can be supplied to the first compressor 21a alone by opening only the first oil ON-OFF switching means 27a (see ① of FIG. 2). When the first and second compressors 21a, 21b are run and the third compressor 21c is stopped, oil is supplied to both of the running compressors 21a, 21b by periodically supplying oil to one or the other of the running first and second compressors 21a, 21b for a prescribed time t1 each. Similarly, when the first, second, and third compressors 21a to 21c are all run, oil is supplied to all of the running compressors 21a to 21c by periodically supplying oil to one or the other of the first, second, and third compressors 21a to 21c for a prescribed time t2 each. Thus, when two or more compressors are running, oil is supplied intermittently to only one compressor at a time through the oil return pipes and, as a result, oil is supplied reliably to all of the running compressors. Thus, the reliability of the oil supply to the compressors can be improved.

Additionally, the oil equalization control means 41 controls the oil ON-OFF switching means in such a manner that when one oil ON-OFF switching means is switched from the open state to the closed state and another oil ON-OFF switching means is switched from the closed state to the open state, there is a transitional period during which both oil ON-OFF switching means are in the open state simultaneously. Consequently, such undesirable situations as all of the oil ON-OFF switching means being closed such that the discharge of oil from the oil separators is obstructed can be prevented. As a result, the flow of oil through the oil equalizing circuit 42 can be switched in a reliable manner.

Moreover, since the oil equalization control means 41 operates the oil ON-OFF switching means 27a to 27c by detecting which of the first, second, and third compressors 21a to 21c are running, the same control can be accomplished regardless of which compressors among the first, second, and third compressors 21a to 21c are running. Thus, oil can be delivered reliably to two running compressors not only when it is the first and second compressors 21a, 21b that are running, but also when, for example, it is the first and third compressors 21a, 21c that are running. As a result, the service life of the compressors can be extended.

[Second Embodiment]

Figure 3:
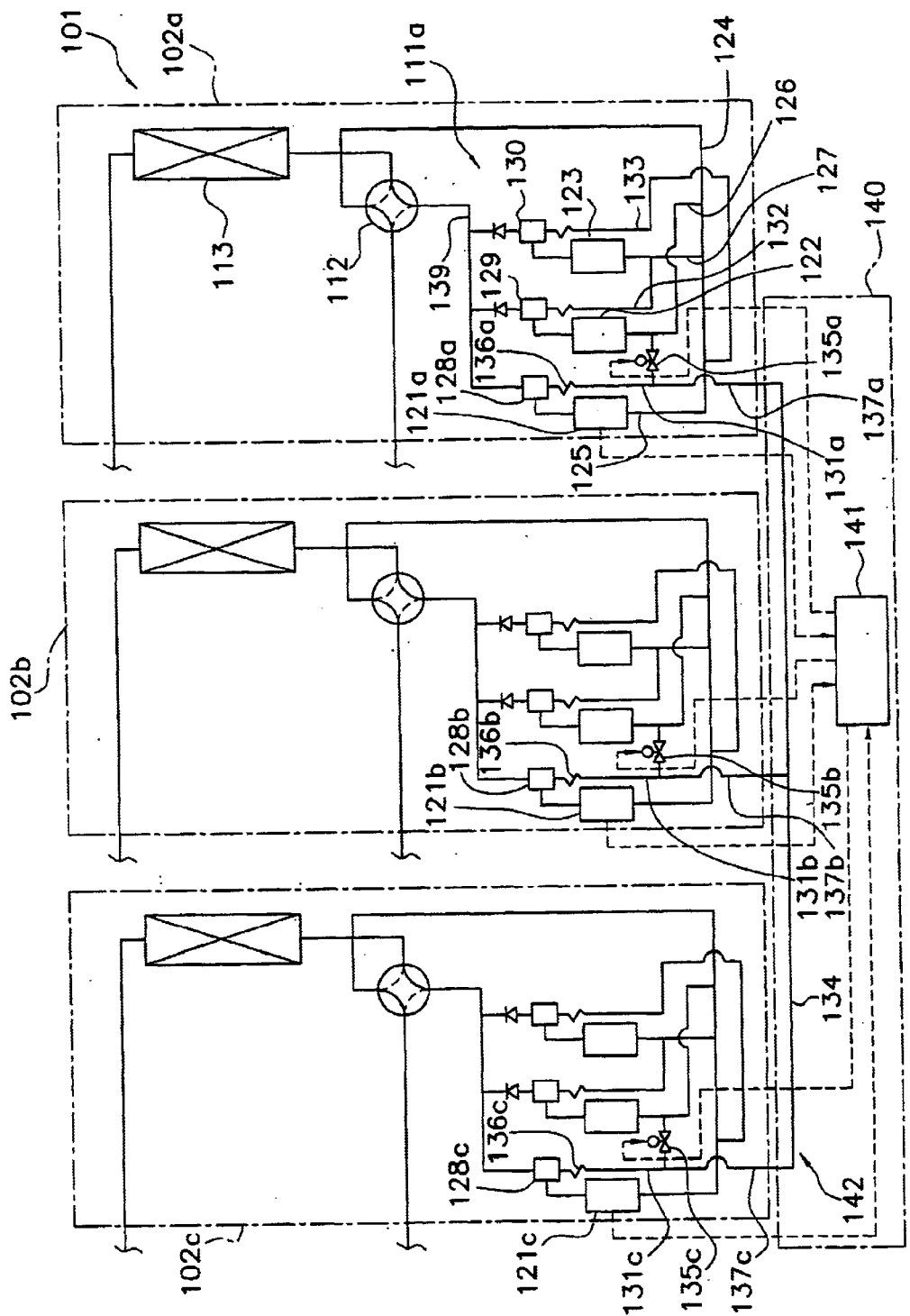
FIG. 3 is a schematic view of the refrigerant circuit of an air conditioning system provided with an oil equalizing circuit in accordance with a second embodiment.

(1) Constituent Features of the Refrigerant Circuit and Oil Equalizing Circuit of the Air Conditioning System FIG. 3 is a schematic view of the refrigerant circuit of an air conditioning system 101 serving as a second embodiment of a compression mechanism oil equalizing circuit in accordance with the present invention and a refrigeration system provided with the same. The air conditioning system 101 is provided with a plurality of heat source units (three in this embodiment), i.e., first, second, and third heat source units 102a to 102c, and a plurality of user units (not shown in the figure) connected in parallel to the heat source units. The air conditioning system 101 is a large-capacity air conditioning system in which the first, second, and third heat source units 102a to 102c are connected in parallel and each is provided with a plurality of compressors.

The first, second, and third heat source units 102a to 102c will now be described. Since the second and third heat source units 102b, 102c are constructed in the same manner as the first heat source unit 102a, the first heat source unit 102a will be described in detail while omitting similar descriptions of the second and third heat source units 102b, 102c.

The first heat source unit 102a is equipped chiefly with a compression mechanism 111a, a four-way selector valve 112, and heat-source-side heat exchanger 113. These devices 111a, 112, 113 are connected together along with the user units (not shown) with refrigerant piping to form the refrigerant circuit of the air conditioning system 101.

The first compression mechanism 111a serves to compress the gaseous refrigerant that returns to the heat source unit 102a from the user unit (not shown) and is provided with the following: first, second, and third compressors 121a, 122, 123; a refrigerant intake main pipe 124; first, second, and third intake branch pipes 125, 126, 127; first, second, and third oil separators 128a, 129, 130; and first, second, and third oil return pipes 131a, 132, 133. The refrigerant intake main pipe 124 connects to the outlet of the four-way selector valve 112. The refrigerant pipes at the outlets of the first, second, and third oil separators 128a, 129, 130 merge with the discharge merge pipe 139. The discharge merge pipe 139 connects to the inlet of the four-way selector valve 112.

Among the first, second, and third compressors 121a, 122, 123, the first compressor 121a runs constantly when the heat source unit 102a is running and the second and third compressors 122, 123 are started and stopped depending on the operating load of the first heat source unit 102a.

The second intake branch pipe 126 branches from the refrigerant intake main pipe 124 and is connected such that it corresponds to the intake side of the second compressor 122. The third intake branch pipe 127 branches from the refrigerant intake main pipe 124 at a position downstream of the second intake branch pipe 126 and is connected such that it corresponds to the intake side of the third compressor 123. The first intake branch pipe 125 branches from the refrigerant intake main pipe 124 at a position downstream of the third intake branch pipe 127 and is connected to the intake side of the first compressor 121a. The refrigerant intake main pipe 124 is arranged such that it slopes downward from the part where it connects to the second and third intake branch pipes 126, 127 toward the part where it connects to the first intake branch pipe 125.

The first, second, and third separators 128a, 129, 130 are connected to the discharge sides of the respective first, second, and third compressors 121a, 122, 123 in order to separate the oil from the gaseous refrigerant compressed by the first, second, and third compressors 121a, 122, 123.

The first and second oil return pipes 131a, 132 connect from the oil outlets of the first and second oil separators 128a, 129 to the intake sides of the second and third compressors 122, 123, respectively. The third oil return pipe 133 is connected from the third oil separator 130 to the intake side of the first compressor 121a. More specifically, the first and second oil return pipes 131a, 132 are connected to the second and third intake branch pipes 126, 127, respectively, and the third oil return pipe 133 is connected to the refrigerant intake main pipe 124 at a position downstream of the second intake branch pipe 126.

The first oil return pipe 131a is connected to the intake side of the second compressor 122 such that oil is delivered to the refrigerant intake main pipe 124 due to gravity when the first compressor 121a is running and the second and third compressors 122, 123 are stopped. The second oil return pipe 132 is connected to the intake side of the third compressor 123 such that oil is delivered to the refrigerant intake main pipe 124 due to gravity when the first and second compressors 121a, 122 are running and the third compressor 123 is stopped. More specifically, the second and third intake branch pipes 126, 127 are arranged such that they slope downward from the part where they connect to the first and second oil return pipes 131a, 132, respectively, toward the part where they connect to the refrigerant intake main pipe 124.

The second heat source unit 102b has a second compressor mechanism 111b, a first compressor 121b, a first oil separator 128b, and a first oil return pipe 131b, similarly to the first heat source unit 102a which has a first compressor mechanism 111a, a first compressor 121a, a first oil separator 128a, and a first oil return pipe 131a. Likewise, the third heat source unit 102c has a third compressor mechanism 111c, a first compressor 121c, a first oil separator 128c, and a first oil return pipe 131c.

The air conditioning system 101 is further provided with an oil equalizing circuit 142 for equalizing the distribution of oil among the compressor mechanisms 111a to 111c of the heat source units 102a to 102c. The oil equalizing circuit 142 is made up of the following: the first oil separator 128a and first return pipe 131a of the first heat source unit 102a; the first oil separator 128b and first oil return pipe 131b of the second heat source unit 102b; the first oil separator 128c and first oil return pipe 131c of the third heat source unit 102c; a communication pipe 134; first, second, and third oil ON-OFF switching means 135a to 135c; and first, second, and third pressure reducing means 136a to 136c.

The oil separators 128a to 128c are connected to the discharge sides of the first, second, and third compressors 121a to 121c of the first, second, and third compression mechanisms 111a to 111c, respectively, and serve to separate oil from the gaseous refrigerant. As described previously, the oil return pipes 131a to 131c connect the first oil separators 128a to 128c of the heat source units 102a to 102c to the intake sides of the compressors 121a to 121c, respectively, and serve to deliver oil separated by the oil separators 128a to 128c to the intake sides of the compressors 121a to 121c. The communication pipe 134 is connected to the oil return pipes 131a to 131c so that the oil return pipes 131a to 131c can communicate with each other. More specifically, connection pipes 137a to 137c for connecting to the communication pipe 134 are connected to the oil return pipes 131a to 131c between the oil separators 128a to 128c and the first, second, and third oil ON-OFF switching means 135a to 135c. The oil return pipes 131a to 131c of the heat source units 102a to 102c are connected together through these connection pipes 137a to 137c.

The first, second, and third oil ON-OFF switching means 135a to 135c are provided in the oil return pipes 131a to 131c, respectively, and serve both to ensure the flow of oil through the communication pipe 134 from the oil separators 128a to 128c and to turn on and shut off the delivery of oil from the oil separators 128a to 128c to the intake sides of the compressors 121a to 121c. More specifically, the first, second, and third oil ON-OFF switching means 135a to 135c are solenoid valves provided downstream of the parts where the oil return pipes 131a to 131c connect to the communication pipe 134.

The first, second, and third pressure reducing means 136a to 136c are provided in the oil return pipes 131a to 131c or in the communication pipe 134 and serve to reduce the pressure of the oil that flows from the oil separators 128a to 128c to the intake sides of the compressors 121a to 121c and the communication pipe 134. More specifically, the first, second, and third pressure reducing means 136a to 136c are capillary tubes provided upstream of the parts where the oil return pipes 131a to 131c connect to the communication pipe 134.

The air conditioning system 101 is further provided with an oil equalization control means 141 that detects if the compression mechanisms 111a to 111c (more specifically, first compressor 121a of the first compression mechanism 111a, the first compressor 121b of the second compression mechanism 111b, and the first compressor 121c of the third compression mechanism 111c) are running or stopped and opens and closes the first, second, and third oil ON-OFF switching means 135a to 135c accordingly. More specifically, the oil equalization control means 141 detects if each of the first, second, and third compressors 111a to 111c is running or stopped and executes control to close the oil ON-OFF switching means corresponding to the stopped compressors so that oil does not flow to the intake sides of the stopped compressors and control to open the oil ON-OFF switching means corresponding to running compressors so that oil is supplied to the intake sides of the running compressors. In this embodiment, the oil equalization control means 141 is built into the oil equalizing unit 140 along with the communication pipe 134 of the oil equalizing circuit 142.

(2) Operation of the Air Conditioning System and the Oil Equalizing Circuit

Figure 4:
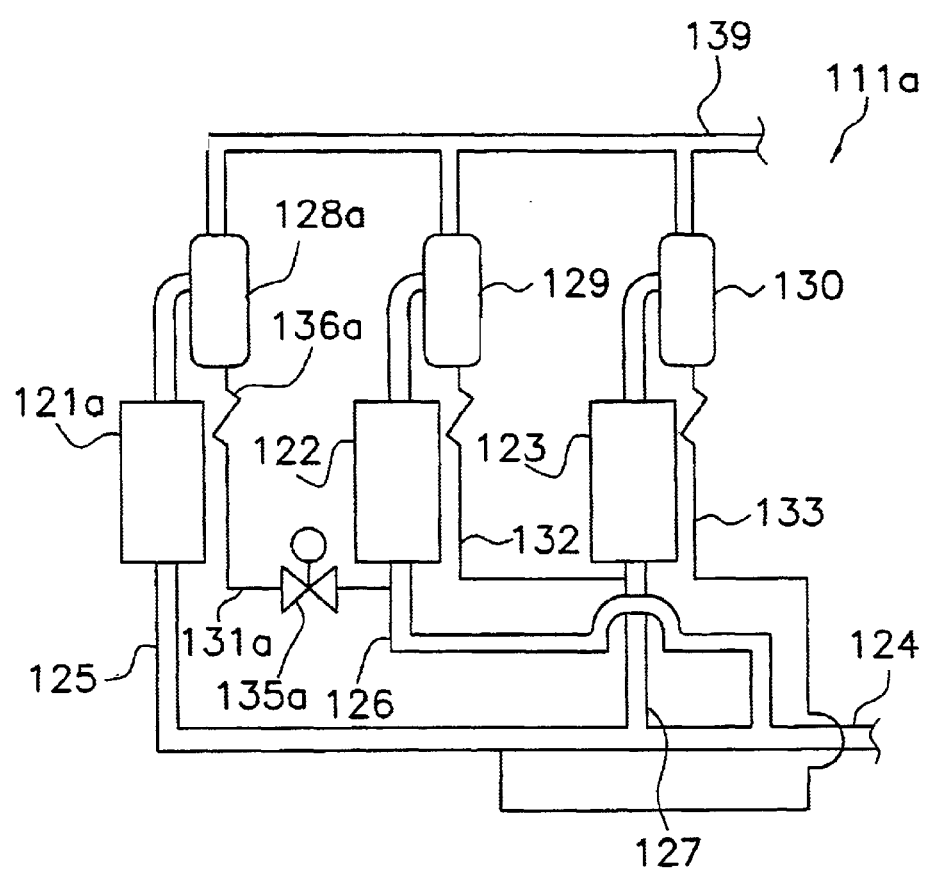
FIG. 4 is illustrates the refrigerant circuit and oil circuit of the compression mechanism inside a heat source unit of the second embodiment.
Figure 5:
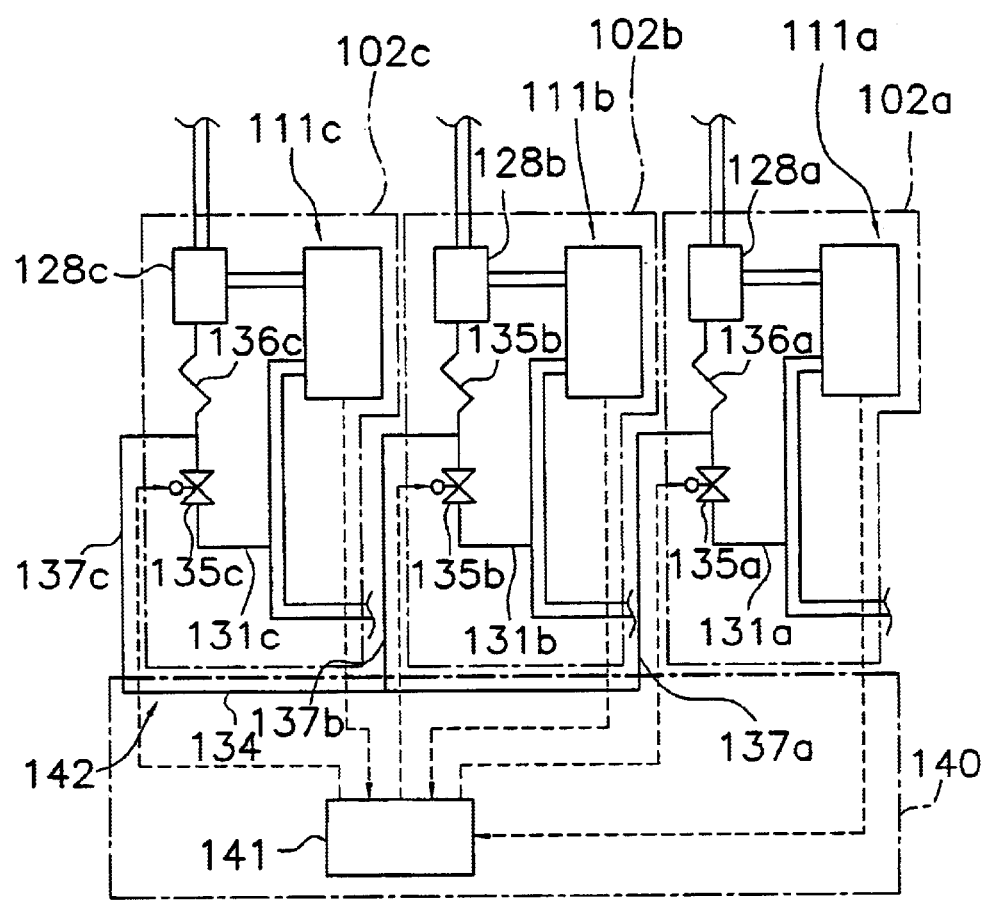
FIG. 5 is illustrates the connections between the oil equalizing unit and the compression mechanisms of the heat source units shown in FIG. 3.

The operation of the air conditioning system 101 and oil equalizing circuit 142 of this embodiment will now be described using FIGS. 3 to 5. FIG. 4 illustrates the refrigerant circuit and oil circuit of the compression mechanism 111a inside the first heat source unit 102a. FIG. 5 is a simplified view showing only the compression mechanism and oil equalizing circuit portions of FIG. 3 and illustrating the connections between the compression mechanisms 111a to 111c of the heat source units 102a to 102c and the oil equalizing circuit 142.

[1] Partial Load Operation (First Heat Source Unit Running)

When only the first heat source unit 102a of the air conditioning system 101 is run, the first compressor 121a of the first the compression mechanism 111a is started and oil together with gaseous refrigerant flows from the refrigerant intake main pipe 124 into the first compressor 121a through the first intake branch pipe 125. The gaseous refrigerant drawn into the first compressor 121a is then compressed and discharged, after which it flows into the first oil separator 128a. Since the gaseous refrigerant discharged from the first compressor 121a contains excess oil, the excess oil is separated from the gaseous refrigerant by vapor-liquid separation in the first oil separator 128a. Then, the gaseous refrigerant passes through the refrigerant pipe at the outlet of the first oil separator 128a and flows into the discharge merge pipe 139.

Meanwhile, the oil equalization control means 141 detects that the first compression mechanism 111a of the first heat source unit 102a (more specifically, the first compressor 121a) is running and that the second compression mechanism 111b of the second heat source unit 102b and the third compression mechanism 111c of the third heat source unit 102c are stopped and issues an open command to the first oil ON-OFF switching means 135a and a close command to the second and third oil ON-OFF switching means 135b, 135c. As a result of this control, similarly to the first embodiment, oil separated by the first oil separator 128a is returned to the first intake branch pipe 125 through the first oil return pipe 131a and drawn again into the first compression mechanism 111a (more specifically, the first compressor 121a) along with gaseous refrigerant. In this way, when only the first compression mechanism 111a is run, oil is supplied to the first compression mechanism 111a and not to the other compression mechanisms 111b, 111c.

In the heat source unit 102a, the oil separated in the first oil separator 128a leaves the oil outlet of the first oil separator 128a, passes through the first oil return pipe 131a, and flows into the second intake branch pipe 126. Then, since the second intake branch pipe 126 is configured so as to slope downward from the part where it connects to the first return pipe 131a to the part where it connects to the refrigerant intake main pipe 124, the oil that flows into the second intake branch pipe 126 from the first oil return pipe 131a flows down the second intake branch pipe 126 due to the action of gravity and into the refrigerant intake main pipe 124. After it flows into the refrigerant intake main pipe 124, the oil is drawn into the first compressor 121a again along with gaseous refrigerant flowing through the refrigerant intake main pipe 124. Since the refrigerant intake main pipe 124 slopes downward toward the first intake branch pipe 125, the oil flowing into the refrigerant intake main pipe 124 flows readily toward the first intake branch pipe 125. In this way, an oil supply circuit is formed in which oil is supplied to the first compressor 121a only.

If, after the first compressor 121a is started, the second compressor 122 is started in order to increase the operating load of the first heat source unit 102a, a portion of the gaseous refrigerant flowing through the refrigerant intake main pipe 124 will be drawn into the second compressor 122 through the second intake branch pipe 126. Meanwhile, the oil that flows into the second intake branch pipe 126 from the first oil return pipe 131a is drawn into the second compressor 122 along with the gaseous refrigerant flowing through the second intake branch pipe 126. Similarly to the gaseous refrigerant drawn into the first compressor 121a, the gaseous refrigerant drawn into the second compressor 122 is then compressed and discharged, after which it flows into the second oil separator 129 where the gaseous refrigerant and oil are separated by vapor-liquid separation. Then, the gaseous refrigerant passes through the refrigerant pipe at the outlet of the second oil separator 129 and flows into the discharge merge pipe 139.

In the first heat source unit 102a, the oil separated in the second oil separator 129 leaves the oil outlet of the second oil separator 129, passes through the second oil return pipe 132, and flows into the third intake branch pipe 127. Then, since the third intake branch pipe 127, similarly to the second intake branch pipe 126, is configured so as to slope downward from the part where it connects to the second return pipe 132 to the part where it connects to the refrigerant intake main pipe 124, the oil that flows into the third intake branch pipe 127 from the second oil return pipe 132 flows into the refrigerant intake main pipe 124 due to the action of gravity. The third intake branch pipe 127 connects?? at a position closer to the first intake branch pipe 125 than the second intake branch pipe 126 does, i.e., at a position further downstream relative to the flow of the gaseous refrigerant. Consequently, the oil that flows into the refrigerant intake main pipe 124 from the third intake branch pipe 127 is drawn into the first compressor 121a again along with the gaseous refrigerant flowing through the refrigerant intake main pipe 124 and does not flow into the second compressor 122. In this way, an oil supply circuit is formed inside the first compression mechanism 111a such that oil is supplied in turn to the first and second compressors 121a, 122 only.

If, after the second compressor 122 is started, the third compressor 123 is started in order to raise the first heat source unit 102a to full-load operation, a portion of the gaseous refrigerant flowing through the refrigerant intake main pipe 124 will be drawn into the third compressor 123 through the third intake branch pipe 127. Meanwhile, the oil that flows into the third intake branch pipe 127 from the second oil return pipe 132 is drawn into the third compressor 123 along with the gaseous refrigerant flowing through the third intake branch pipe 127. Similarly to the gaseous refrigerant drawn into the first and second compressors 121a and 122, the gaseous refrigerant drawn into the third compressor 123 is compressed and discharged, after which it is separated from the oil by vapor-liquid separation in the third oil separator 130. Then, the gaseous refrigerant passes through the refrigerant pipe at the outlet of the third oil separator 130 and flows into the discharge merge pipe 139.

Meanwhile, inside the first heat source unit 102a, the oil separated in the third oil separator 130 leaves the oil outlet of the third oil separator 130, passes through the third oil return pipe 133, and flows into refrigerant intake main pipe 124 at a position between where the first intake branch pipe 125 connects and where the third intake branch pipe 127 connects. In this way, an oil supply circuit is formed in which oil is supplied in turn to all of the compressors, i.e., the first, second, and third compressors 121a, 122, 123, of the first compression mechanism 111a.

[2] Partial Load Operation (First and Second Heat Source Units Running)

Now a situation in which, after the first heat source unit 102a is started, the second compression mechanism 111b of the second heat source unit 102b is started in order to further increase the operating load will be described. The operation of the compressors that make up the second compression mechanism 111b is not described here because it is the same as the operation of the first compression mechanism 111a.

When the first and second compression mechanisms 111a, 111b are run, the oil equalization control means 141 detects that the first and second compression mechanisms 111a, 111b are running and the third compression mechanism 111c is stopped and issues an open command to the first and second oil ON-OFF switching means 135a, 135b and a close command to the third oil ON-OFF switching means 135c. As a result of this control, the distribution of oil between the first and second compression mechanisms 111a, 111b is equalized similarly to the oil equalization control executed between the compressors 21a and 21b of the first embodiment and, thus, oil is supplied to the compression mechanisms that are running, i.e., the first and second compression mechanisms 111a, 111b.

[3] Partial Load Operation (First, Second, and Third Heat Source Units 102a to 102c Running)

Now a situation in which, after the second compression mechanism 111b is started, the third compression mechanism 111c of the third heat source unit 102c is started in order to achieve full-load operation will be described. The operation of the compressors that make up the third compression mechanism 111c is not described here because it is the same as the operation of the first and second compression mechanisms 111a, 111b.

When the compression mechanisms 111a to 111c are run, the oil equalization control means 141 detects that the compression mechanisms 111a to 111c are running and issues an open command to the first, second, and third oil ON-OFF switching means 135a to 135c. As a result of this control, the distribution of oil between the compression mechanisms 111a to 111c is equalized similarly to the oil equalization control executed between the compressors 21a to 21c of the first embodiment and, thus, oil is supplied to the compression mechanisms that are running, i.e., the compression mechanisms 111a to 111c.

(3) Characteristic Features of the Air Conditioning System and the Oil Equalizing Circuit With the oil equalizing circuit 142 of this embodiment, the same oil equalization control as is executed by the oil equalizing circuit 42 of the first embodiment is executed among the heat source units 102a to 102c.

Thus, the reliability of the oil equalization control in a large-capacity air conditioning system provided with a plurality of heat source units can be improved by executing oil equalization control among the heat source units 102a to 102c.

Also, while in the past it has been necessary to produce a variety of heat source units range from small capacity to large capacity in order to meet the demands of users, a large-capacity air conditioning system having highly reliable oil equalization control can be achieved by connecting a plurality of small-capacity heat source units together with the previously described oil equalizing circuit. Thus, the need to produce heat source units of various capacities is eliminated and manufacturing costs can be reduced.

Also, since the heat source units 102a to 102c are each provided with connection pipes 137a to 137c serving as a pipe nozzle for connecting to the communication pipe 134, when the heat source units 102a to 102c are connected in parallel, the oil equalizing circuit 142 can be established with ease by merely connecting the communication pipe 134 to the connection pipes 137a to 137c.

Furthermore, onsite installation can be made easier by producing an oil equalizing unit 140 as a product that comprises an oil equalization control means 141 and a portion of an oil equalizing circuit 142 (i.e., communication pipe 134, etc.) like those previously described.

[Third Embodiment]

Figure 6:
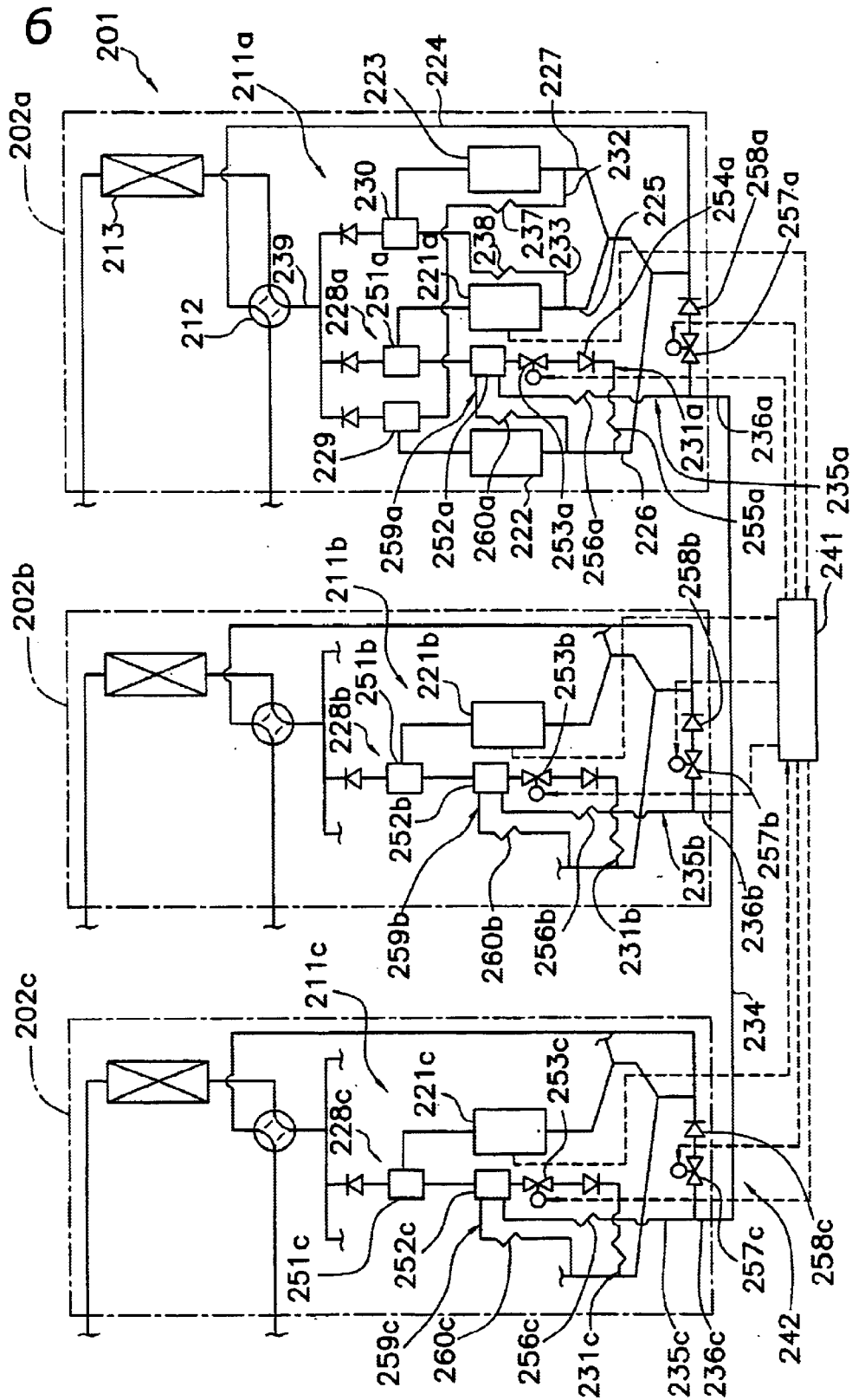
FIG. 6 is a schematic view of the refrigerant circuit of an air conditioning system provided with an oil equalizing circuit in accordance with a third embodiment.

(1) Constituent Features of the Refrigerant Circuit and Oil Equalizing Circuit of the Air Conditioning System FIG. 6 is a schematic view of the refrigerant circuit of an air conditioning system 201 serving as a third embodiment of a compression mechanism oil equalizing circuit in accordance with the present invention and a refrigeration system provided with the same. The air conditioning system 201 is provided with a plurality of heat source units (three in this embodiment), i.e., first, second, and third heat source units 202a to 202c, and a plurality of user units (not shown in the figure) connected in parallel to the heat source units. The air conditioning system 201 is a large-capacity air conditioning system in which, similarly to the air conditioning system 101 of the second embodiment, the first, second, and third heat source units 202a to 202c are connected in parallel and each is provided with a plurality of compressors.

The first, second, and third heat source units 202a to 202c will now be described. Since the second and third heat source units 202b, 202c are constructed in the same manner as the first heat source unit 202a, the first heat source unit 202a will be described in detail while omitting similar descriptions of the second and third heat source units 202b, 202c (portions of the compression mechanisms of the second and third heat source units 202b, 202c have also been simplified in FIG. 6).

The first heat source unit 202a is equipped chiefly with a first compression mechanism 211a, a four-way selector valve 212, and heat-source-side heat exchanger 213. These devices 211a, 212, 213 are connected together along with the user units (not shown) by refrigerant piping to form the refrigerant circuit of the air conditioning system 201.

Figure 7:
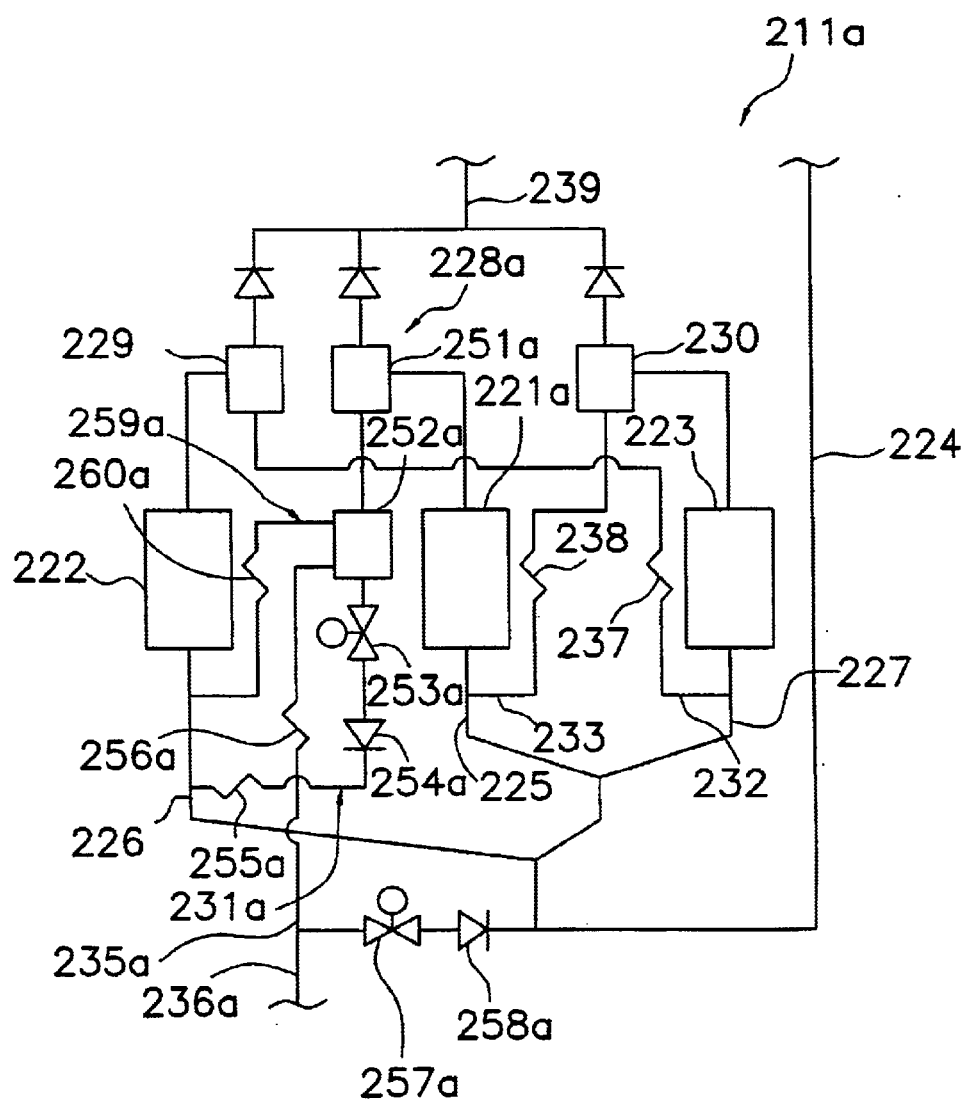
FIG. 7 is illustrates the refrigerant circuit and oil circuit of the compression mechanism inside a heat source unit of the third embodiment.

As shown in FIGS. 6 and 7, the first compression mechanism 211a serves to compress the gaseous refrigerant that returns to the heat source unit 202a from the user units (not shown) and is provided with the following: first, second, and third compressors 221a, 222, 223; a refrigerant intake main pipe 224; first, second, and third intake branch pipes 225, 226, 227; first, second, and third oil separators 228a, 229, 230; and first, second, and third separator-side oil return pipes 231a, 232, 233. The refrigerant intake main pipe 224 connects to the outlet of the four-way selector valve 212. The refrigerant pipes at the outlets of the first, second, and third oil separators 228a, 229, 230 merge with the discharge merge pipe 239. The discharge merge pipe 239 connects to the inlet of the four-way selector valve 212.

Among the first, second, and third compressors 221a, 222, 223, the first compressor 221a runs constantly when the heat source unit 202a is running and the second and third compressors 222, 223 are started and stopped depending on the operating load of the first heat source unit 202a.

The second intake branch pipe 226 branches from the refrigerant intake main pipe 224 and is connected such that it corresponds to the intake side of the second compressor 222. The first intake branch pipe 225 and the third intake branch pipe 227 branch from the refrigerant intake main pipe 224 at positions farther downstream than the position where the second intake branch pipe 226 branches from the same and connect so as to correspond to the intake sides of the first compressor 221a and third compressor 223, respectively. The first, second, and third intake branch pipes 225, 226, 227 are configured such that they slope downward toward the parts where they connect to the refrigerant intake main pipe 224.

The first, second, and third oil separators 228a, 229, 230 are connected to the discharge sides of the respective first, second, and third compressors 221a, 222, 223 in order to separate the oil from the gaseous refrigerant compressed by the first, second, and third compressors 221a, 222, 223. The oil separator 228a is designed to separate oil in two stages and has a first stage oil separator 251a that is connected to the discharge side of the first compressor 221a and configured to separate oil from the gaseous refrigerant and a second stage oil separator 252a that is connected to the first stage oil separator 251a and configured to collect the oil separated by the first stage oil separator 251a. With this first oil separator 228a, the oil separated from the gaseous refrigerant in the first stage oil separator 251a can be immediately sent to the second stage oil separator 252a, thereby reducing the amount of oil mixing with the gaseous refrigerant flowing out of the first stage oil separator 251a.

The separator-side oil return pipe 231a is connected from the oil outlet of the first oil separator 228a to the intake side of the second compressor 222. More specifically, the separator-side oil return pipe 231a is connected to the second stage oil separator 252a of the first oil separator 228a. More specifically, the separator-side oil return pipe 231a has a separator-side oil ON-OFF switching means 253a, a separator-side non-return means 254a, and a separator-side pressure reducing means 255a. The separator-side oil ON-OFF switching means 253a is a solenoid valve for turning on and shutting off the supply of oil from the first oil separator 228a to the intake side of the compressor 222. The separator-side non-return means 254a is a check valve that only allows oil to flow from the first oil separator 228a to the intake side of the compressor 222. The separator-side pressure reducing means 255a is a capillary tube for reducing the pressure of the oil flowing from the first oil separator 228a to the intake side of the second compressor 222.

The second stage oil separator 252a of the first oil separator 228a is provided with a gas return pipe 259a that connects the gas phase section inside the second stage oil separator 252a to the intake side of the second compressor 222. As a result, gaseous refrigerant and other gaseous components mixed with the oil sent from the first stage oil separator 251a and collected in the second stage oil separator 252a can be returned to the intake side of the second compressor 222. The gas return pipe 259a has a pressure reducing means 260a comprising a capillary tube for reducing the pressure of the oil flowing from the second stage oil separator 252a to the intake side of the second compressor 222.

The separator-side oil return pipe 232 is connected from the oil outlet of the second oil separator 229 to the intake side of the third compressor 223. The separator-side oil return pipe 232 has a separator-side pressure reducing means 237 comprising a capillary tube for reducing the pressure of the oil flowing from the second oil separator 229 to the intake side of the third compressor 223.

The separator-side oil return pipe 233 is connected from the third oil separator 230 to the intake side of the first compressor 221a. The separator-side oil return pipe 233 has a separator-side pressure reducing means 238 comprising a capillary tube for reducing the pressure of the oil flowing from the third oil separator 230 to the intake side of the first compressor 221a.

The separator-side oil return pipe 231a is connected to the intake side of the second compressor 222 such that oil is delivered to the refrigerant intake main pipe 224 by gravity when the first compressor 221a is running and the second and third compressors 222, 223 are stopped. The separator-side oil return pipe 232 is connected to the intake side of the third compressor 223 such that oil is delivered to the refrigerant intake main pipe 224 by gravity when the first and second compressors 221a, 222 are running and the third compressor 223 is stopped. More specifically, the second and third intake branch pipes 226, 227 are arranged such that they slope downward from the parts where they connect to the separator-side oil return pipes 231a, 232, respectively, toward the parts where they connect to the refrigerant intake main pipe 224.

Similarly to the first heat source unit 202a, which is provided with a first compression mechanism 211a including a first compressor 221a, a first oil separator 228a comprising a first stage oil separator 251a and a second stage oil separator 252a, and a separator-side oil return pipe 231a having a gas return pipe 259a and a separator side oil ON-OFF switching means 253a, the second heat source unit 202b is provided with a second compression mechanism 211b including a first compressor 221b, a first oil separator 228b comprising a first stage oil separator 251b and a second stage oil separator 252b, and a separator-side oil return pipe 231b having a gas return pipe 259b and a separator side oil ON-OFF switching means 253b. Likewise, the third heat source unit 202c is provided with a third compression mechanism 211c including a first compressor 221c, a first oil separator 228c comprising a first stage oil separator 251c and a second stage oil separator 252c, and a separator-side oil return pipe 231c having a gas return pipe 259c and a separator side oil ON-OFF switching means 253c.

The air conditioning system 201 is further provided with an oil equalizing circuit 242 for equalizing the distribution of oil among the heat source units 202a to 202c. The oil equalizing circuit 242 is made up of the following: a communication pipe 234; the first oil separator 228a, oil-equalization-side oil return pipe 235a, and connection pipe 236a of the first heat source unit 202a; the first oil separator 228b, oil-equalization-side oil return pipe 235b, and connection pipe 236b of the second heat source unit 202b; the first oil separator 228c, oil-equalization-side oil return pipe 235c, and connection pipe 236c of the third heat source unit 202c.

The oil-equalization-side oil return pipes 235a to 235c are provided in the heat source units 202a to 202c, respectively, and serve to connect the second stage oil separators 252a to 252c of the heat source units 202a to 202c to the intake sides of the first compressors 221a to 221c, respectively, so that oil separated by the first oil separators 228a to 228c is delivered to the intake sides of the compression mechanisms 211a to 211c (more specifically, the refrigerant intake main pipe). More specifically, the oil-equalization-side oil return pipes 235a to 235c are connected the second stage oil separators 252a to 252c of the first oil separators 228a to 228c of the heat source units 202a to 202c and include the following: oil-equalization-side pressure reducing means 256a to 256c; first, second and third oil-equalization-side oil ON-OFF switching means 257a to 257c; and oil-equalization-side non-return means 258a to 258c.

The communication pipe 234 is connected to the oil-equalization-side oil return pipes 235a to 235c so that the oil-equalization-side oil return pipes 235a to 235c can communicate with each other. More specifically, connection pipes 236a to 236c are connected to the oil-equalization-purpose oil return pipes 235a to 235c between the first oil separators 228a to 228c and the oil-equalization-side oil ON-OFF switching means 257a to 257c, respectively. By connecting the connection pipes 236a to 236c to the communication pipe 234, the oil-equalization-side oil return pipes 235a to 235c of the heat source units 202a to 202c are allowed to communicate with each other.

The oil-equalization-side pressure reducing means 256a to 256c are provided in the oil-equalization-side oil return pipes 235a to 235c and serve to reduce the pressure of the oil that flows from the first oil separators 228a to 228c to the intake sides of the compression mechanisms 211a to 211c and the communication pipe 234. More specifically, the oil-equalization-side pressure reducing means 256a to 256c are capillary tubes provided between the second stage oil separators 252a to 252c and the connection pipes 236a to 236c.

The first, second, and third oil-equalization-side oil ON-OFF switching means 257a to 257c are provided in the oil-equalization-side oil return pipes 235a to 235c, respectively, and serve both to ensure the flow of oil to the communication pipe 234 from the first oil separators 228a to 228c and to turn on and shut off the delivery of oil from the first oil separators 228a to 228c to the intake sides of the compression mechanisms 211a to 211c. More specifically, the first, second, and third oil-equalization-side oil ON-OFF switching means 257a to 257c are solenoid valves provided downstream of the parts where the oil-equalization-side oil return pipes 235a to 235c connect to the communication pipe 234.

The oil-equalization-side non-return means 258a to 258c are check valves that only allow oil to flow from the first oil separators 228a to 228c to the intake sides of the compression mechanisms 211a to 211c.

The air conditioning system 201 is further provided with an oil equalization control means 241 that detects if the compression mechanisms 211a to 211c (more specifically, the first compressor 221a of the first compression mechanism 211a, the first compressor 221b of the second compression mechanism 211b, and the first compressor 221c of the third compression mechanism 211c) are running or stopped and opens and closes the first, second, and third oil-equalization-side oil ON-OFF switching means 257a to 257c accordingly. More specifically, the oil equalization control means 241 detects if the first, second, and third compression mechanisms 211a to 211c is running or stopped and executes control to close the oil ON-OFF switching means corresponding to the stopped compressors so that oil does not flow to the intake sides of the stopped compressors and control to open the oil ON-OFF switching means corresponding to running compressors so that oil is supplied to the intake sides of the running compressors.

(2) Operation of the Air Conditioning System and the Oil Equalizing Circuit

The operation of the air conditioning system 201 and oil equalizing circuit 242 of this embodiment will now be described using FIGS. 6 to 7.

[1] Partial Load Operation (First Heat Source Unit Running)

When only the first heat source unit 202a of the air conditioning system 201 is run, the first compressor 221a of the compression mechanism 211a is started and oil together with gaseous refrigerant flows from the refrigerant intake main pipe 224 into the first compressor 221a through the first intake branch pipe 225. The gaseous refrigerant drawn into the first compressor 221a is then compressed and discharged, after which it flows into the first oil separator 228a. Since the gaseous refrigerant discharged from the first compressor 221a contains excess oil, the excess oil is separated from the gaseous refrigerant by vapor-liquid separation in the first oil separator 228a. Then, the gaseous refrigerant passes through the refrigerant pipe at the outlet of the first oil separator 228a and flows into the discharge merge pipe 239. Since the first oil separator 228a is made up of a first stage oil separator 251a and a second stage oil separator 252a, the oil separated from the gaseous refrigerant in the first stage oil separator 251a can be immediately sent to the second stage oil separator 252a, thereby reducing the amount of oil mixing with the gaseous refrigerant flowing out of the first stage oil separator 251a.

Meanwhile, the oil equalization control means 241 detects that the first compression mechanism 211a of the first heat source unit 202a (more specifically, the first compressor 221a) is running and that the second compression mechanism 211b of the second heat source unit 202b and the third compression mechanism 211c of the third heat source unit 202c are stopped and issues an open command to the first oil-equalization-side oil ON-OFF switching means 257a and a close command to the second and third oil-equalization-side oil ON-OFF switching means 257b, 257c. As a result of this control, oil separated by the first oil separator 228a is returned to the intake side of the first compression mechanism 211a through the oil-equalization-side oil return pipe 235a and is drawn again into the first compression mechanism 211a (more specifically, the first compressor 221a) along with gaseous refrigerant. In this way, when only the first compression mechanism 211a is run, oil is supplied to the first compression mechanism 211a and not to the second and third compression mechanisms 211b, 211c.

In addition to issuing open and close commands to the first, second, and third oil-equalization-side oil ON-OFF switching means 257a to 257c as just described, the oil equalization control means 241 issues an open command to the separator-side oil ON-OFF switching means 253a of the first heat source unit 202a, which is running, and a close command to the separator-side oil ON-OFF switching means 253b, 253c of second and third heat source units, which are stopped. As a result, oil that has collected inside the oil separators 228b, 228c (more specifically, the second stage oil separators 252b, 252c) of the stopped heat source units 202b, 202c is sent to the oil-equalization-side oil return pipe 235a of the first heat source unit 202a through the oil-equalization-side return pipes 235b, 235c and the communication pipe 234 and delivered to the intake side of the first compression mechanism 211a of the first heat source unit 202a. Thus, oil does not collect at the intake side of the compression mechanisms 211b, 211c of the stopped heat source units 202b, 202c.

In the heat source unit 202a, the oil sent to the second stage oil separator 252a of the first oil separator 228a is temporarily collected in the second stage oil separator 252a. Then, the gaseous refrigerant and other gaseous components mixed with the oil are sent to the intake side of the second compressor 222 through the gas return pipe 259a and the other liquid components are sent to the intake side of the second compressor 222 through the separator-side oil return pipe 231a because the separator-side oil ON-OFF switching means 253a is open. The oil that flows into the second intake branch pipe 226 from the second stage oil separator 252a through the separator-side oil return pipe 231a descends through the second intake branch pipe 226 due to the action of gravity and is delivered to the refrigerant intake main pipe 224. After it flows into the refrigerant intake main pipe 224, the oil joins oil delivered from the other compression mechanisms 211b, 211c through the communication pipe 234 and is drawn into the first compressor 221a again along with gaseous refrigerant flowing through the refrigerant intake main pipe 224.

If, after the first compressor 221a is started, the second compressor 222 is started in order to increase the operating load of the first heat source unit 202a, a portion of the gaseous refrigerant flowing through the refrigerant intake main pipe 224 will be drawn into both the second compressor 222 through the second intake branch pipe 226. The oil that flows into the second intake branch pipe 226 from the gas return pipe 259a and the separator-side oil return pipe 231a is drawn into the second compressor 222 along with the gaseous refrigerant flowing through the second intake branch pipe 226. Similarly to the gaseous refrigerant drawn into the first compressor 221a, the gaseous refrigerant drawn into the second compressor 222 is then compressed and discharged, after which it is separated from the oil by vapor-liquid separation in the second oil separator 229. Then, the gaseous refrigerant passes through the refrigerant pipe at the outlet of the second oil separator 229 and flows into the discharge merge pipe 239.

In the first heat source unit 202a, the oil separated in the second oil separator 229 leaves the oil outlet of the second oil separator 229, passes through the second oil return pipe 232, and flows into the third intake branch pipe 227. As a result, the oil that flows into the third intake branch pipe 227 from the separator-side oil return pipe 232 is delivered to the refrigerant intake main pipe 224 due to the action of gravity. The oil that flows into the refrigerant intake main pipe 224 from the third intake branch pipe 227 is drawn into the first compressor 221a again along with the gaseous refrigerant flowing through the refrigerant intake main pipe 224 and does not flow into the second compressor 222.

If, after the second compressor 222 is started, the third compressor 223 is started in order to raise the first heat source unit 202a to full-load operation, a portion of the gaseous refrigerant flowing through the refrigerant intake main pipe 224 will be drawn into the third compressor 223 through the third intake branch pipe 227. The oil that flows into the third intake branch pipe 227 from the separator-side oil return pipe 232 is drawn into the third compressor 223 along with the gaseous refrigerant flowing through the third intake branch pipe 227. Similarly to the gaseous refrigerant drawn into the second compressor 222, the gaseous refrigerant drawn into the third compressor 223 is then compressed and discharged, after which it is separated from the oil by vapor-liquid separation in the second oil separator 230. Then, the gaseous refrigerant passes through the refrigerant pipe at the outlet of the third oil separator 230 and flows into the discharge merge pipe 239.

In the first heat source unit 202a, the oil separated in the third oil separator 230 leaves the oil outlet of the third oil separator 230, passes through the separator-side oil return pipe 233, and flows into the first intake branch pipe 225. In this way, oil is supplied in turn to all of the first, second, and third compressors 221a, 222, 223 of the first compression mechanism 211a.

[2] Partial Load Operation (First and Second Heat Source Units Running)

Now a situation in which, after the first heat source unit 202a is started, the second compression mechanism 211b of the second heat source unit 202b is started in order to further increase the operating load will be described. The operation of the compressors that make up the second compression mechanism 211b is not described here because it is the same as the operation of the first compression mechanism 211a.

When the first and second compression mechanisms 211a, 211b are run, the oil equalization control means 241 detects that the first and second compression mechanisms 211a, 211b are running and the third compression mechanism 211c is stopped and issues an open command to the first and second oil-equalization-side oil ON-OFF switching means 257a, 257b and a close command to the third oil-equalization-side oil ON-OFF switching means 257c. The oil equalization control means 241 issues an open command to the separator-side oil ON-OFF switching means 253a, 253b of the first and second heat source units 202a, 202b, which are running. As a result of this control, the distribution of oil between the first and second compression mechanisms 211a, 211b is equalized similarly to the oil equalization control executed between the compressors 21a and 21b of the first embodiment and, thus, oil is supplied to the compression mechanisms that are running, i.e., the first and second compression mechanisms 211a, 211b.

[3] Full Load Operation (First, Second, and Third Heat Source Units Running)

Now a situation in which, after the second compression mechanism 211b is started, the third compression mechanism 211c of the third heat source unit 202c is started in order to achieve full-load operation will be described. The operation of the compressors that make up the third compression mechanism 211c is not described here because it is the same as the operation of the first and second compression mechanisms 211a, 211b.

When the compression mechanisms 211a to 211c are run, the oil equalization control means 241 detects that the compression mechanisms 211a to 211c are running and issues open commands both to the first, second, and third oil-equalization-side oil ON-OFF switching means 257a to 257c as well as to the separator-side oil ON-OFF switching means 253a to 253c of the first, second, and third heat source units 202a to 202c, which are running. As a result of this control, the distribution of oil between the compression mechanisms 211a to 211c is equalized similarly to the oil equalization control executed between the compressors 21a to 21c of the first embodiment and, thus, oil is supplied to the compression mechanisms that are running, i.e., the compression mechanisms 211a to 211c.

(3) Characteristic Features of the Air Conditioning System and the Oil Equalizing Circuit With the oil equalizing circuit 242 of this embodiment, the same oil equalization control as is executed by the oil equalizing circuit 142 of the second embodiment is executed among the heat source units 202a to 202c and the same effects as the second embodiment are achieved.

Also with the oil equalization circuit of this embodiment, the separating capacity of the oil separator as a whole is improved because the first oil separators 228a to 228c of the heat source units 202a to 202c are two-stage oil separators comprising a first stage oil separator 251a to 251c and a second stage oil separator 252a to 252c.

[Other Embodiments]

Although embodiments of the present invention have been described herein with reference to the drawings, the specific constituent features are not limited to those of these embodiments and variations can be made within a scope that does not deviate from the gist of the invention.

(1) It is also acceptable to provide a common oil separator of the kind described in the first embodiment with respect to a plurality of compressors.

(2) The number of compressors and the type of compressor are not limited to the first, second, and third embodiments. Also, the number of heat source units and the operating capacity of the heat source units are not limited to the second and third embodiments.

(3) In the second embodiment, the communication pipe that connects the heat source units together and the oil equalization control means are provided as separate units from the heat source units. It is also acceptable for these items to be built into the heat source units.

Applicability to Industry

By utilizing the present invention, the supply of oil to compression mechanisms that are stopped can be cut off and a sufficient amount of oil can be supplied to the compression mechanisms that are running, thereby improving the reliability of the oil supply to the compression mechanisms.

What is claimed is:

1. An oil equalizing circuit comprising:
   a plurality of oil separators that are configured to be provided on discharge sides of compression mechanisms that compress refrigerant in a vapor compression refrigeration system and configured to separate oil from refrigerant;
   a plurality of oil return pipes that are configured to connect each of the oil separators to an intake side of one of the compression mechanisms and configured to allow the oil separated by the oil separators to be delivered to the intake sides of the compression mechanisms;
   a communication pipe connected to the oil return pipes so that the oil return pipes can communicate with each other;
   a plurality of oil ON-OFF switching mechanisms that are provided in the oil return pipes and configured and arranged to ensure a flow of the oil from the oil separators to the communication pipe and to open and close such that the ON-OFF switching mechanisms turn on and shut off a delivery of the oil from the oil separators to the intake sides of the compression mechanisms; and
   a plurality of pressure reducing mechanisms that are provided in one of the oil return pipes and the communication pipe and configured to reduce pressure of the oil sent from the oil separators to the communication pipe and the intake sides of the compressor mechanisms.

2. The oil equalizing circuit as recited in claim 1, wherein the oil separators are provided in such a manner that one of the oil separators corresponds to each of the compression mechanisms.

3. The oil equalizing circuit as recited in claim 1, wherein the oil separators each include a first stage oil separator that is configured to be connected to one of the discharge sides of the compression mechanisms and configured to separate the oil from the refrigerant and a second stage oil separator that is connected to the first stage oil separator and configured to collect the oil separated by the first stage oil separator; and
   the oil return pipes are connected to the second stage oil separators.

4. The oil equalizing circuit as recited in claim 3, further comprising
   a plurality of gas return pipes configured to connect gas phase sections of the second stage oil separators to the intake sides of the compression mechanisms.

5. The oil equalizing circuit as recited in claims 1, wherein the oil ON-OFF switching mechanisms are provided downstream of parts where the oil return pipes connect to the communication pipe.

6. The oil equalizing circuit as recited in claim 1, wherein the pressure reducing mechanisms are provided upstream of parts where the oil return pipes connect to the communication pipe.

7. The oil equalizing circuit as recited in claim 1, wherein the pressure reducing means mechanisms are capillary tubes.

8. The oil equalizing circuit as recited in claim 2, wherein the oil separators each include a first stage oil separator that is configured to be connected to one of the discharge sides of the compression mechanisms and configured to separate the oil from the refrigerant and a second stage oil separator that is connected to the first stage oil separator and configured to collect the oil separated by the first stage oil separator; and
   the oil return pipes are connected to the second stage oil separators.

9. The oil equalizing circuit as recited in claim 8, further comprising
   a plurality of gas return pipes configured to connect gas phase sections of the second stage oil separators to the intake sides of the compression mechanisms.

10. The oil equalizing circuit as recited in claim 9, wherein
    the oil ON-OFF switching mechanisms are provided downstream of parts where the oil return pipes connect to the communication pipe.

11. The oil equalizing circuit as recited in claim 10, wherein
    the pressure reducing mechanisms are provided upstream of the parts where the oil return pipes connect to the communication pipe.

12. The oil equalizing circuit as recited in claim 11, wherein
    the pressure reducing mechanisms are capillary tubes.

13. A refrigeration system comprising:
    a plurality of compression mechanisms configured to compress refrigerant;
    an oil equalizing circuit including
    a plurality of oil separators that are provided on discharge sides of the compression mechanisms and configured to separate oil from the refrigerant;
    a plurality of oil return pipes that connect each of the oil separators to an intake side of one of the compression mechanisms and are configured to allow the oil separated by the oil separators to be delivered to the intake sides of the compression mechanisms;
    a communication pipe connected to the oil return pipes so that the oil return pipes can communicate with each other;
    a plurality of oil ON-OFF switching mechanisms that are provided in the oil return pipes and configured and arranged to ensure a flow of the oil from the oil separators to the communication pipe and to open and close such that the ON-OFF switching mechanisms turn on and shut off a delivery of the oil from the oil separators to the intake sides of the compression mechanisms; and
    a plurality of pressure reducing mechanisms that are provided in one of the oil return pipes and the communication pipe and configured to reduce pressure of the oil sent from the oil separators to the communication pipe and the intake sides of the compressor mechanisms; and
    an oil equalization control mechanism configured to detect if the compression mechanisms are running or stopped, execute control to close the oil ON-OFF switching mechanisms corresponding to the stopped compression mechanisms so that the oil does not flow to the intake sides of the stopped compression mechanisms, and execute control to open the oil ON-OFF switching mechanisms corresponding to running compression mechanisms so that the oil is supplied to the intake sides of the running compression mechanisms.

14. A refrigeration system comprising:

a plurality of compression mechanisms configured to compress refrigerant;

an oil equalizing circuit including a plurality of oil separators that are provided on discharge sides of the compression mechanisms and configured to separate oil from the refrigerant;

a plurality of oil return pipes that connect each of the oil separators to an intake side of one of the compression mechanisms and are configured to allow the oil separated by the oil separators to be delivered to the intake sides of the compression mechanisms;

a communication pipe connected to the oil return pipes so that the oil return pipes can communicate with each other;

a plurality of oil ON-OFF switching mechanisms that are provided in the oil return pipes and configured and arranged to ensure a flow of the oil from the oil separators to the communication pipe and to open and close such that the ON-OFF switching mechanisms turn on and shut off a delivery of the oil from the oil separators to the intake sides of the compression mechanisms; and a plurality of pressure reducing mechanisms that are provided in one of the oil return pipes and the communication pipe and configured to reduce pressure of the oil sent from the oil separators to the communication pipe and the intake sides of the compressor mechanisms; and an oil equalization control mechanism configured to detect if the compression mechanisms are running or stopped; execute control to close the oil ON-OFF switching mechanisms corresponding to the stopped compression mechanisms so that the oil does not flow to the intake sides of the stopped compression mechanisms; and execute control such that when one of the compression mechanisms is running, the oil is supplied to the intake side of the running compression mechanism by opening the oil ON-OFF switching mechanism corresponding to the running compression mechanism and when at least two of the compression mechanisms are running, the oil is supplied to the intake sides of the at least two of the running compression mechanisms by opening the oil ON-OFF switching mechanisms corresponding to the at least two of the running compression mechanisms one at a time for a prescribed period of time in a periodic manner, keeping the other of the oil ON-OFF switching mechanisms closed.

15. The refrigeration system as recited claim 14, wherein the oil equalization control mechanism controls the oil ON-OFF switching mechanisms corresponding to the compression mechanisms that are running in such a manner that when one of the oil ON-OFF switching mechanisms is switched from a open state to a closed state and another of the oil ON-OFF switching mechanisms is switched from a closed state to a open state, there is a transitional period during which the one of the oil ON-OFF switching mechanisms and the another of the oil ON-OFF switching mechanisms are both in the open states, respectively, simultaneously.

16. A heat source unit comprising:

a compression mechanism configured to compress refrigerant;

an oil separator that is disposed on a discharge side of the compression mechanism and to separate oil from the refrigerant;

an oil return pipe provided with an oil ON-OFF switching mechanism that can turn on and shut off the supply of the oil from the oil separator to an intake side of the compression mechanism;

a connection pipe that is connected to the oil return pipe between the oil separator and the oil ON-OFF switching mechanism and configured to connect the the heat source unit to oil return pipes of the compressor mechanisms of other heat source units.

17. The heat source unit as recited in claim 16, wherein the oil separator includes a first stage oil separator that is connected to the discharge side of the compression mechanism and configured to separate oil from the refrigerant and a second stage oil separator that is connected to the first stage oil separator and configured to collect the oil separated by the first stage oil separator; and the oil return pipe is connected to the second stage oil separator.

18. The heat source unit as recited in claim 17, further comprising a gas return pipe connecting a gas phase section of the second stage oil separator to the intake side of the compression mechanism.

19. A refrigeration system comprising:

a plurality of heat source units as recited in claim 16; and a communication pipe connecting the connection pipes of the heat source units together.

20. A refrigeration system comprising:

a plurality of heat source units as recited in claim 18, and a communication pipe connecting the connection pipes of the heat source units together.

* * * * *

UNITED STATES PATENT AND TRADEMARK OFFICE
CERTIFICATE OF CORRECTION

PATENT NO.     : 6,941,767 B2
DATED          : September 13, 2005
INVENTOR(S)    : Hiromune Matsuoka et al.

It is certified that error appears in the above-identified patent and that said Letters Patent is hereby corrected as shown below:

Column 25,
Line 13, change "refrigerant" to -- the refrigerant --;
Line 66, delete "means".

Column 27,
Line 52, insert -- while -- after "time in a periodic manner,".

Column 28,
Line 17, insert -- configured -- after "compression mechanism and".

Signed and Sealed this

Second Day of May, 2006

JON W. DUDAS
*Director of the United States Patent and Trademark Office*